(12) United States Patent
Bansal et al.

(10) Patent No.: US 11,544,675 B2
(45) Date of Patent: Jan. 3, 2023

(54) CONTEXTUALLY AWARE SCHEDULE SERVICES

(71) Applicant: MICROSOFT TECHNOLOGY LICENSING, LLC, Redmond, WA (US)

(72) Inventors: Ruchi Bansal, Hyderabad (IN); Pankaj Khanzode, Hyderabad (IN); Satish Chandra, Hyderabad (IN); Venkata Suman Yaram, Hyderabad (IN); Sadhvi Shekhar, Hyderabad (IN); Pavan Kumar Dasari, Hyderabad (IN); Ankit Rastogi, Hyderabad (IN); Tony Thampan, Hyderabad (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/502,715

(22) Filed: Jul. 3, 2019

(65) Prior Publication Data
US 2021/0004770 A1    Jan. 7, 2021

(51) Int. Cl.
| G06Q 10/00 | (2012.01) |
| G06Q 10/10 | (2012.01) |
| G06F 9/451 | (2018.01) |
| G06Q 50/00 | (2012.01) |

(52) U.S. Cl.
CPC ......... *G06Q 10/1095* (2013.01); *G06F 9/453* (2018.02); *G06Q 50/01* (2013.01)

(58) Field of Classification Search
None
See application file for complete search history.

(56) References Cited

U.S. PATENT DOCUMENTS

| 2003/0126136 A1* | 7/2003 | Omoigui ............. H04L 29/06 |
| 2010/0174575 A1* | 7/2010 | Farrell ........... G06Q 10/063116 |
|  |  | 705/7.14 |
| 2012/0271676 A1 | 10/2012 | Aravamudan et al. |

(Continued)

OTHER PUBLICATIONS

Persona: A Proactive Computing Approach for Mobile Data Services UK Sengupta, SH Robinson, SM Bennett, AV Anderson—2004—researchgate.net (Year: 2004).*

(Continued)

*Primary Examiner* — Hafiz A Kassim
(74) *Attorney, Agent, or Firm* — Shook, Hardy & Bacon L.L.P.

(57) ABSTRACT

Technologies described herein offer a contextually aware schedule service technology. User-related activity is monitored to detect a future event related to the user. Information is extracted from the monitored user-related activity information. The extracted information about the future event can be evaluated to determine whether it is related to another future event associated with the user. When a particular future event for the user changes, a set of related events may be utilized to determine a related event is affected by the change. For example, a user may be notified to cancel or modify the future event. Additionally, service providers associated with the affected event(s) may be notified, or a personal assistant service may facilitate automatically rescheduling the affected events.

20 Claims, 8 Drawing Sheets

(56) References Cited

U.S. PATENT DOCUMENTS

| | | | | |
|---|---|---|---|---|
| 2014/0278605 A1* | 9/2014 | Borucki | ............ | G06Q 30/0617 705/5 |
| 2015/0095086 A1 | 4/2015 | Gopinath et al. | | |
| 2016/0350722 A1* | 12/2016 | Walker | ............... | G06Q 10/1093 |
| 2017/0098197 A1* | 4/2017 | Yu | ........................ | G06Q 30/02 |
| 2017/0316386 A1* | 11/2017 | Joshi | ................ | G06Q 10/1095 |
| 2018/0190144 A1* | 7/2018 | Corelli | .................. | G10L 15/22 |
| 2018/0293532 A1* | 10/2018 | Singh | ................ | G06Q 10/1095 |
| 2018/0349858 A1* | 12/2018 | Walker | ............... | G06Q 10/1095 |
| 2018/0365651 A1* | 12/2018 | Sreedhara | ............... | G06F 16/29 |
| 2020/0193335 A1* | 6/2020 | Sekhar | ............... | G06Q 30/0282 |
| 2020/0285936 A1* | 9/2020 | Sen | .................. | G06Q 10/1095 |

OTHER PUBLICATIONS

Intelligent agent based flight search and booking system F Garvey, S Sankaranarayanan—. . . Research in Artificial Intelligence, 2012—Citeseer (Year: 2012).*

Turist@: Agent-based personalised recommendation of tourist activities M Batet, A Moreno, D Sánchez, D Isern . . .—Expert Systems with . . . , 2012—Elsevier (Year: 2012).*

"International Search Report and Written Opinion Issued in PCT Application No. PCT/US20/032407", dated Aug. 3, 2020, 12 Pages.

* cited by examiner

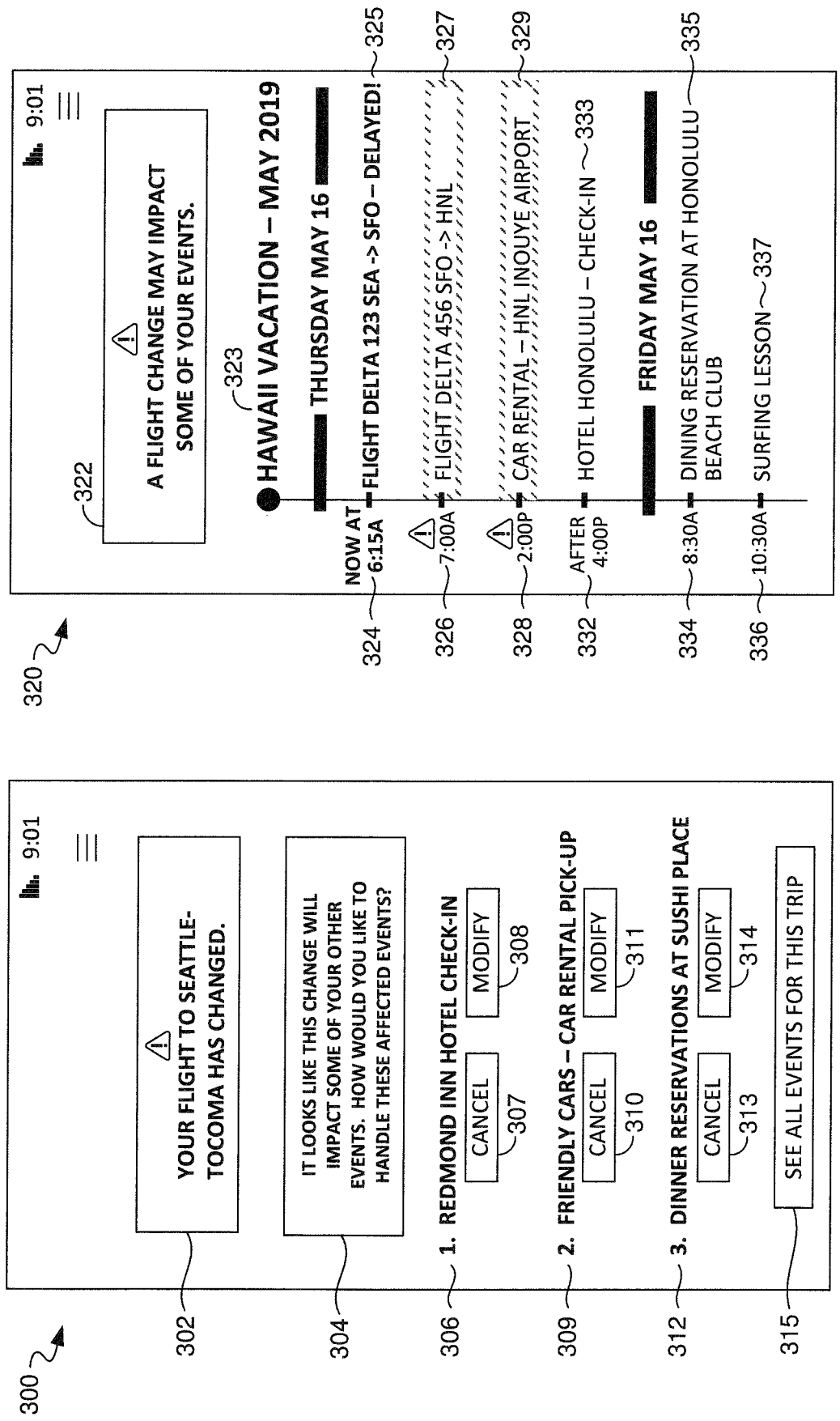

CONTEXTUALLY AWARE SCHEDULE SERVICES

BACKGROUND

Often people have plans that include multiple, related events. For example, a business trip to another city might include flights, car rental, hotel reservation, meetings, and dinner reservation events; an offsite day might include multiple breakout meetings, a motivational speaker, a lunch reservation, and team-building activities; or a family's vacation might include a series of sight-seeing stops and hotel reservations along a cross-country drive. Sometimes one of the events changes, for instance a flight may be delayed or cancelled. This can have a cascading impact on other related events. For example, if the user misses her flight, then she may be unable to pick up her rental car, or check into her hotel. Or she might catch a later flight and still be able to check into her hotel, but miss her dinner reservation. When a user's circumstances change, such as a delayed flight, not only can this frustrate the user, but it can require undertaking a burdensome effort by the user to identify which other events in the user's plans will be impacted by the change and require a modification, such as a rescheduling or cancelation, which can lead to further frustration.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technologies described in this disclosure are directed towards systems and methods for providing improved computer-performed schedule technologies and contextually aware event-conflict detection and resolution. In particular, embodiments of these technologies can detect changes in a user's circumstances, determine affected future events related to the user's change in circumstances, and mitigate the impact of the changes on the affected events. Some embodiments comprise improved contextually aware event schedule functionality for a virtual assistant program.

At a high level, user-related activity may be monitored to detect a current or future event related to the user (e.g., a flight, a meeting, a dinner reservation, or similar event). Once detected, event content (or information about the event) may be determined or extracted from the monitored user-related activity information. In some embodiments, the event content can also be enriched with supplemental information, such as geo-location, service provider contact information, or similar information that is related to the event or the event content. In this way, the event content can be enhanced with information beyond information included in the monitored user-related activity.

Information about the event can be evaluated to determine whether it is related to one or more future events associated with the user, thereby identifying a set of related events. When a particular event for the user changes, such as a flight delay, the set of related events may be utilized to determine a related future event that is affected by the change, such as a car rental or hotel booking, and a resolution service provided. In this way, embodiments of the disclosure provide an improved computer-performed schedule service as well as an improved user-computing experience.

BRIEF DESCRIPTION OF THE DRAWINGS

Aspects of the technology described in the present application are described in detail below with reference to the attached drawing figures, wherein:

FIGS. 3A-D illustratively depict example graphical user interfaces, which may operate on a personal computing device, showing aspects of example resolution services, in accordance with an embodiment of the present disclosure;

DETAILED DESCRIPTION

Figure 1:
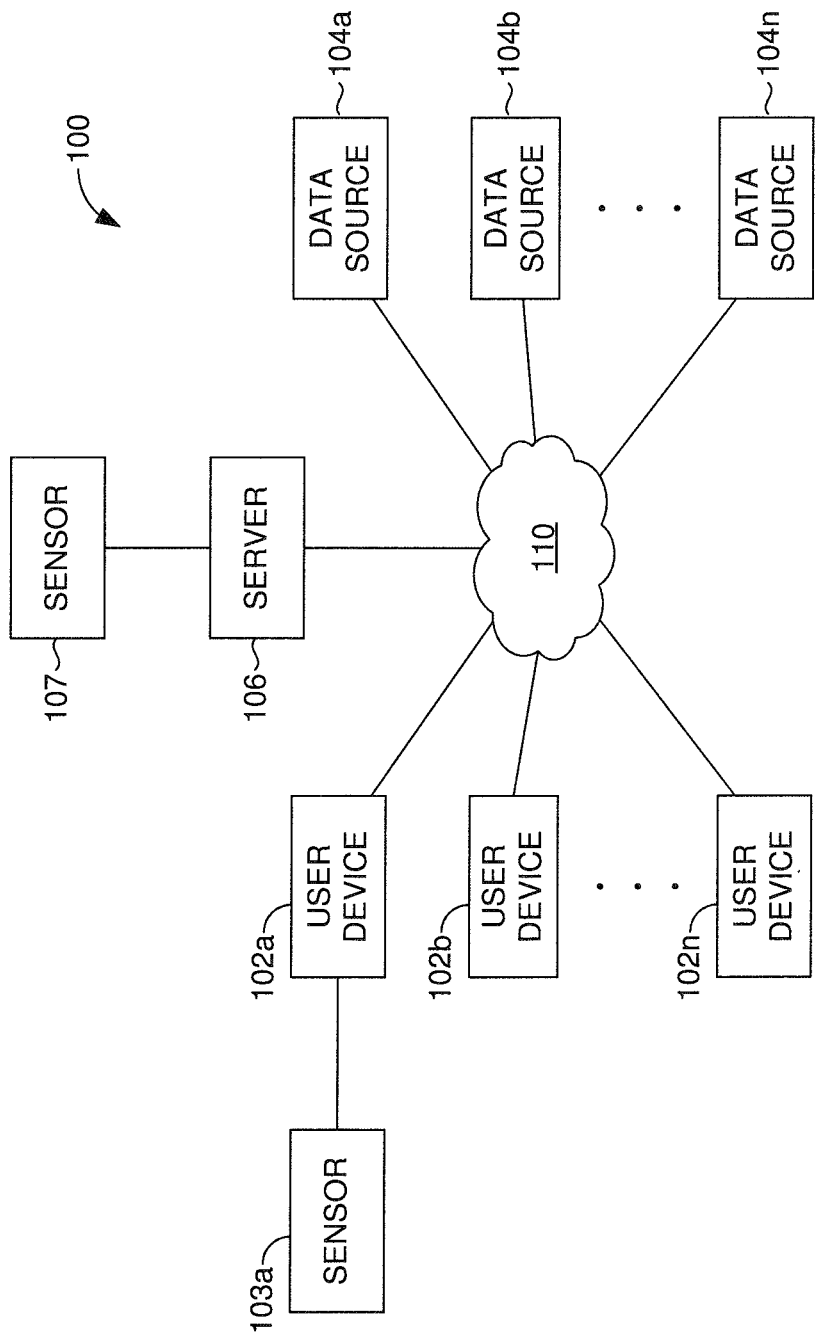
FIG. 1 is a block diagram of an example operating environment suitable for implementing aspects of the disclosure.

The subject matter of aspects of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein provide systems, methods, and computer storage media for, among other things, improved computer-performed schedule applications and services, and contextually aware event-conflict detection and resolution. Embodiments of these technologies can detect changes in a user's circumstances, determine affected future events related to the user's change in circumstances, and mitigate the impact of the changes on the affected events. For example and as further described herein, a user may be notified to cancel or modify an affected event, such as a car rental and hotel booking, due to a delayed flight; service providers associated with the affected events may be notified; or a personal assistant service may facilitate automatically rescheduling the affected events.

Some embodiments improve the functionality of a virtual assistant program or personal digital assistant, which comprises one or more computer programs, and which may operate on or across one or more computing devices. For example, one such virtual assistant is the Cortana® assistant by Microsoft® Corporation. Some embodiments improve the functionality of devices having limited input capabilities such as a smart speaker (which relies on voice input) or a wearable computing device (which utilizes a compact touch-screen). In particular, the limited input capabilities of these devices introduce challenges for the user to modify or manage appointments. For instance, a smart speaker does not have a screen to enable a user to view information about upcoming events affected by a change in circumstances that is captured based on a recent email. As a further example, if the technologies described herein are employed on a smart watch having a compact touch-screen, it is difficult navigating between applications to modify information in one mobile app (e.g., a calendar application) based on information received in another mobile app application (such as an email app or web-browser).

As described previously, often people have plans that include multiple, related events. Users increasingly rely on computer-based systems to organize and manage their schedules. Many people organize their lives utilizing digital calendars, for instance. However, conventional computer-performed scheduling services are not responsive to the user's real-life circumstances, and in particular to changes in those circumstances. In addition, as people's lives have become busier, a user's calendar is often littered with events, and it is easy for a user to forget about how a change in one event or circumstances, such as delayed flight or heavy traffic during a commute, might affect a business meeting later that day.

For instance, if a user is invited to an important meeting with her boss or has reserved a table at her favorite restaurant, she typically wants to know how these important events are affected if another event changes, such as if a client proposes to have a call during her scheduled meeting with her boss or if her children's soccer practice is rained out and is changed to the same night as her favorite restaurant. This is problematic because the user may forget to check her calendar at all, or may not have the time to open multiple applications (e.g., email, text, calendar, or family calendar) on her mobile phone to determine if the update creates a problem. Conventional digital calendar applications are unhelpful in this regard and lack functionality to automatically detect affected events based on changes to the user's circumstances, such as the client's email suggesting a time for a call or a text message indicating that soccer practice has been rescheduled. While some computer scheduling programs may determine whether a meeting-invite time conflicts with an existing meeting invitation, this technology is limited to the specific format of the meeting invite (e.g., the message has to be sent as a calendar invite) or is limited to a single software application (e.g., the user's calendar application).

Moreover, with conventional digital calendar programs, calendar event entries and user event notifications are static, disconnected from other events or the user's circumstances, and generally unaffected by changes in the user's circumstances. Upcoming related events are not linked. As such, the user must always be aware of how a change in one event affects other events. For example, when a person books a flight and hotel, she may receive a communication from each confirming her booking, which may be entered into her digital calendar or a travel app on her mobile device. But if the flight is delayed or cancelled, the hotel reservation and the schedule entry for the hotel reservation remain unchanged. This is because conventional digital calendars (or travel apps) do not detect or react to real-life circumstances affecting the user nor determine a corresponding impact on other future events, such as the hotel reservation. Instead the user, assuming she even knows about the change in circumstances, such as a flight delay, is forced to determine which of her other events are affected by this change, and then must determine how to resolve the impact from the change on each affected event. This can result in a time consuming and burdensome exercise for the user, who may be already frustrated due to the change in circumstance, such as a delayed flight. For instance, the user may be required to remember all of their related events, open up multiple applications such as a calendar, email, and text applications, scroll through her emails to locate information about those events, and determine how the particular change in circumstance, such as a delayed flight, will impact other future events having specific time constraints, such as a check-in or check-out time at a hotel. Additionally, as new electronic devices become available with limited input capabilities, such as a small screen (e.g., a smart watch, or a smart phone) or no screen (e.g., a smart speaker), navigating and synchronizing several applications is even more demanding and cumbersome.

Figure 6A:
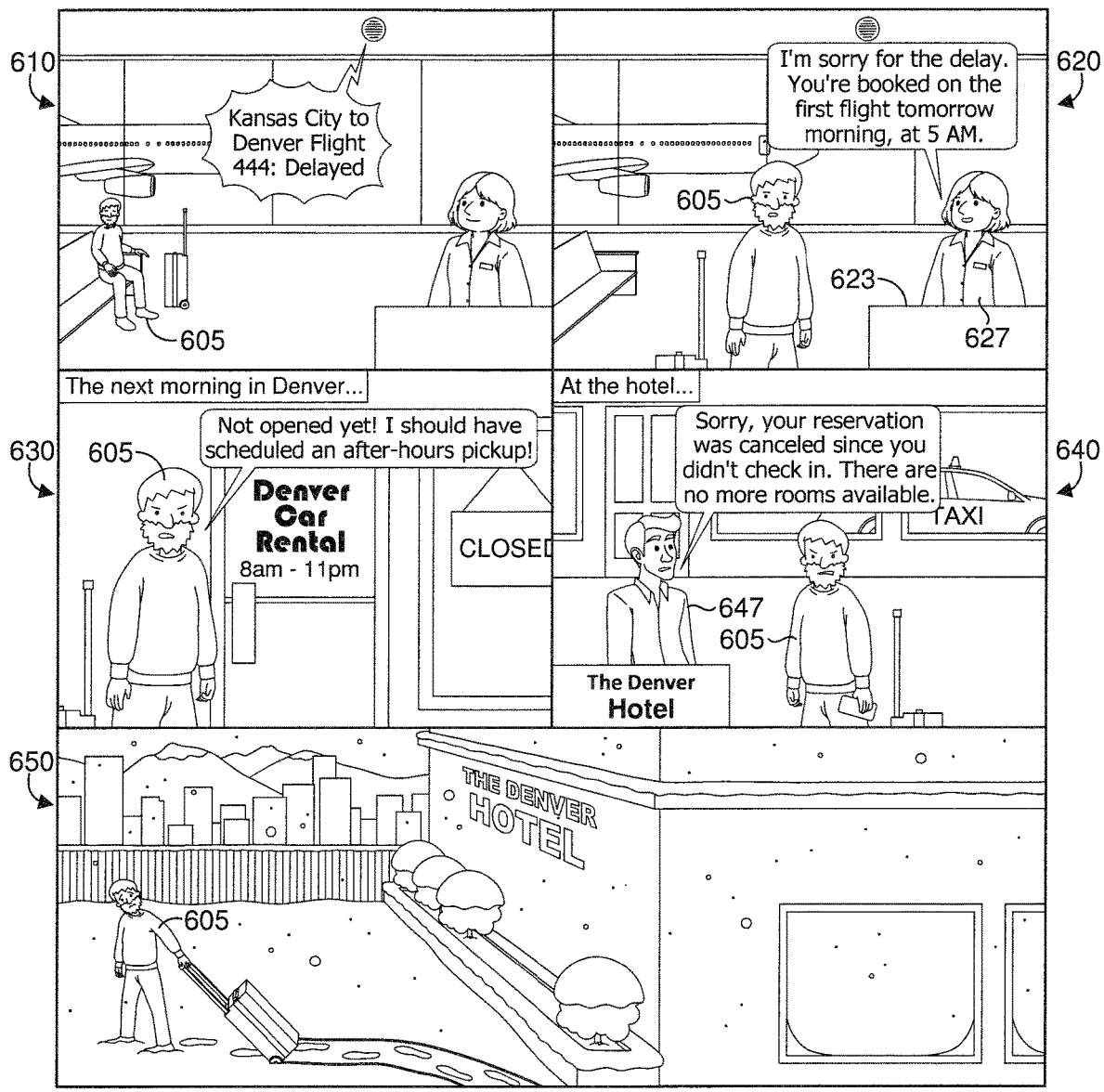
FIG. 6A depicts aspects of an example scenario showing problems resulting from conventional computer-based scheduling technology.

An illustrative example of the problems created by the conventional technology is depicted in FIG. 6A, which shows a user 605 at an airport waiting to board the last flight out of Kansas City to Denver, in scene 610. The user 605 learns, in scene 610, that the flight is delayed, perhaps through an announcement over the airport speaker or through an email from the airline service. In response to the delayed flight, in scene 620 the user 605 becomes frustrated and walks up to the airline desk 623 to determine the cause of the delay. The airline attendant 627 explains that she is sorry for the inconvenience and says that the user 605 is guaranteed to be on the very next flight. However, because the user 605 is on the last flight out of the airport today, the next flight is not until 5:00 AM the next day. In the midst of his frustration, the user 605 forgets that the delayed flight may impact his car rental or hotel reservation.

Turning to scene 630, the user 605 was on the 5:00 AM flight out of Kansas City, but because he arrives in Denver around 6:15 AM, he learns that the car rental office is closed and will not open until 8:00 AM. The user 605 cannot help but get angry at this unfortunate turn of events, so he decides to come back later to rent the car. By scene 640, the user 605 has taken a taxi to his hotel. In scene 640, the user 605 learns that the hotel has given his hotel room to another guest. The hotel employee 647 explains that the hotel assumed the user 605 had cancelled his hotel room since he did not show up the night before. The hotel employee 647 then explains that the hotel is fully booked and has no more rooms available due to a comic book convention. As shown in scene 650, the user 605 is now in Denver with no rental car and no hotel room.

Figure 6B:
FIG. 6B depicts aspects of an alternative scenario from the example of FIG. 6A without the problems, in accordance with an embodiment of this disclosure.

In contrast to this frustrating experience, embodiments of the technologies described herein improve computer-performed scheduling technology by providing robust computer applications and services that monitor user-related activity, such as the user's delayed flight, automatically identify which events (e.g., hotel check-in time or car rental pick-up time) may be impacted by changes, and facilitate resolving these impacts. The user computing experience is also improved by reducing user frustration and minimizing the burden placed on the user when circumstances change. For example, with reference to FIG. 6B, the user 605 from the above example is shown in scene 680 as arriving at the hotel, from an after-hour pick-up of his rental car and checking into the hotel in the morning following the 5:00 AM flight. He is greeted by hotel employee 687, who informs the user that his virtual assistant, Cortana®, contacted the hotel about the delay, and the hotel held the user's room.

Accordingly, at a high level, embodiments disclosed herein comprise computer-performed schedule technologies and contextually aware event-conflict detection and resolution services. Some embodiments comprise a contextually aware schedule service for computer applications that may be configured to detect changes in the user's circumstances, determine whether those changes impact a related event, and facilitate an appropriate action to mitigate the impact. In particular, in some embodiments, user-related activity may be monitored to detect an event associated with the user. The user-related activity may comprise, for example and without limitation, email communications (e.g., a booking or reservation confirmation), SMS text messages, chat, social media posts, voice mail, or other communications received by the user; internet-browsing activity, such as browsing a website to schedule an event (e g, making a dinner reservation on a restaurant website, scheduling a pickup of an online order, or responding to an invitation received via a social media website or application); app activity on a user's computing device (e g, making a reservation on a dining app); purchase transactions or activity on a user's bank account or credit card (e.g., purchasing tickets to a performance or event); or other information that may affect the user, such as flight information received via a flight tracking website. In some embodiments, a user may specify which types of user activity, applications, or user-related information sources, are monitored, and consent may be obtained from the user before monitoring those sources.

An event may be detected from the user-related activity information by utilizing one or more classifiers. As further described herein, a classifier may analyze aspects of the user-related activity information and determine a likelihood that the information indicates a particular type of event, such as a flight, hotel booking, car rental, meeting, concert, or other type event, as described herein. In some embodiments, multiple classifiers may be utilized, each configured to detect a particular event type and determine a score indicating a likelihood that the information indicates that event type. For example, a classifier for detecting flight events may analyze an incoming email for features indicating a flight event, such as flight number, airport codes, airline name, dates, flight times, confirmation number, or similar attributes of a flight reservation. In some embodiments, a classifier may be configured to detect a general event, since it is contemplated that some events may not correspond to an event type, per se. For instance, such a classifier may detect an indication of a date, time, location, or similar attributes that can indicate a happening or an occasion.

Upon detecting an event, information about the event, sometimes referred to herein as event content, may be determined or extracted from the user-related activity information. In particular, in some embodiments, based on the particular detected event type, event content may be identified and extracted from the user-related activity information. For example, in the case of an email confirming a user's flight, information about the flight event such as the date, flight number, airline, departure/arrival time, and origin and destination, may be extracted from the email. In some embodiments, the event content can be identified and extracted by utilizing a set of rules and/or data models, as further described herein.

The event content can also be enriched with supplemental information. In particular, extracted event content can be enhanced with supplemental information that is not contained in the user-related activity information. In some embodiments, the supplemental information may be determined utilizing the extracted event content or other information associated with the user activity. For example, content extracted from an email confirming a flight reservation may include information about a departure airport, e.g., SEA-TAC (Seattle-Tacoma International Airport) and a destination airport, e.g., SFO (San Francisco International Airport), and may also include the airline provider, e.g., Acme Airlines. However, the flight confirmation email, and thus the extracted content, may not contain other useful information such as, without limitation, information regarding a check-in URL, geolocations or other location information of the particular airports, or contact information for the airlines or travel agency (e.g., a phone number or email address) to reschedule the flight. This supplemental information may be determined by utilizing rules and related information sources, such as the websites of service providers (e.g., AcmeAirlines.com) and then stored in association with the extracted event content. In some embodiments, event content, which may be enriched with the supplemental information, is utilized to generate an event data object and may be associated with the user.

Information about a particular event can be evaluated to determine whether it is related to another future event also associated with the user. For instance, in some embodiments and as further described herein, future events may be determined to be related based on one or more characteristics or features associated with the event, which may be included in or determined from the enriched event content. In some embodiments, events may be determined to be related based on a location attribute, temporal attribute, an identification attribute (e.g., a common itinerary name or number or a theme or title, such as a conference name, or the same or similar attendees for the events), or any other attributes. For example and not limitation, events such as an upcoming flight, car rental, and hotel reservation may be determined to be related based a common location (e.g., each of these may involve the city of Denver). Additionally, the flight, car rental, and hotel reservation may be determined to be related based on a common temporal attribute, as they may all occur within 24 hours of each other. Even more, the flight, car rental, and hotel reservation may be determined to be related based on a predefined events template or predefined set of events. For instance, flights, hotel reservation, and car rental often occur when a user takes a trip, and thus may be indicated in a predefined events template. Therefore, some embodiments may utilize such a template or predefined set of events to automatically search user-related activity information for a hotel reservation or car rental when a flight confirmation is detected, and determine these events to be related, as these event types typically occur in combination.

In some embodiments, indications of events determined to be related, such as event data objects for the related events, can be stored in association with each other or otherwise designated as being related. For example, an event data object (sometimes referred to as an event "entity") corresponding to a first event may be stored in association with another entity by utilizing a relational database.

Changes in the user's circumstance may be detected by monitoring the user-related activity. For instance, changes to existing user events already detected, can be detected, and event content can be updated to reflect the changes. Continuing with the non-limiting example above, a second email from Acme Airlines may be received, communicating that the user's flight is delayed. New event content may be extracted from the second email, such as the flight confirmation number, service provider, departure and arrival airports, updated departure or arrival times, or the like. The event content corresponding to the original event information, such as the event information extracted from the first email, can be conflated or reconciled with the updated event content indicating the flight delay. For instance, an event data object corresponding to the flight event may be updated to include the new flight times.

But this change in the user's circumstance may affect some of the user's other, related events, such as a car rental or hotel reservation. Accordingly, in some embodiments and as further described herein, those events are determined that are related to the updated event and affected by the changes. For example, some embodiments may determine whether updated event content corresponding to the changed event likely indicates a conflict will occur with another event. For instance, if a user's flight is delayed until 5:00 AM the next day, there might be a conflict with the user's hotel reservation check-in time later that day since the user will not be arriving on time.

Some embodiments may facilitate the handling of the affected event or mitigating the impact on affected events due to the change in circumstances. For example, some embodiments can assist the user in taking corrective action regarding his car rental and hotel reservation by presenting contact information (which may be determined as supplemental information) to re-schedule those reservations. Some embodiments can automatically re-schedule affected events or facilitate the rescheduling or modification of the event using a virtual assistant. Additionally, some embodiments may provide a notification to a service provider of the event (e.g., a hotel) which may be affected by the change in the user's circumstances, thereby enabling the service provider to take the appropriate action (e.g., maintain the reservation where a user's arrival is delayed). In some embodiments, only the affected event(s), rather than the whole set of related events, is surfaced to the user thereby omitting the unaffected events and streamlining the task of handling the affected events. For example, if the user's delayed flight affects the user's car rental but not the user's hotel reservation, the user can be notified of the affected car rental event, such as the pick-up time, thereby enabling the user to modify or cancel the car rental.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 4 herein. By way of example and not limitation, a user device may be embodied as a personal computer (PC), a laptop computer, a mobile or mobile device, a smartphone, a tablet computer, a smart speaker, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
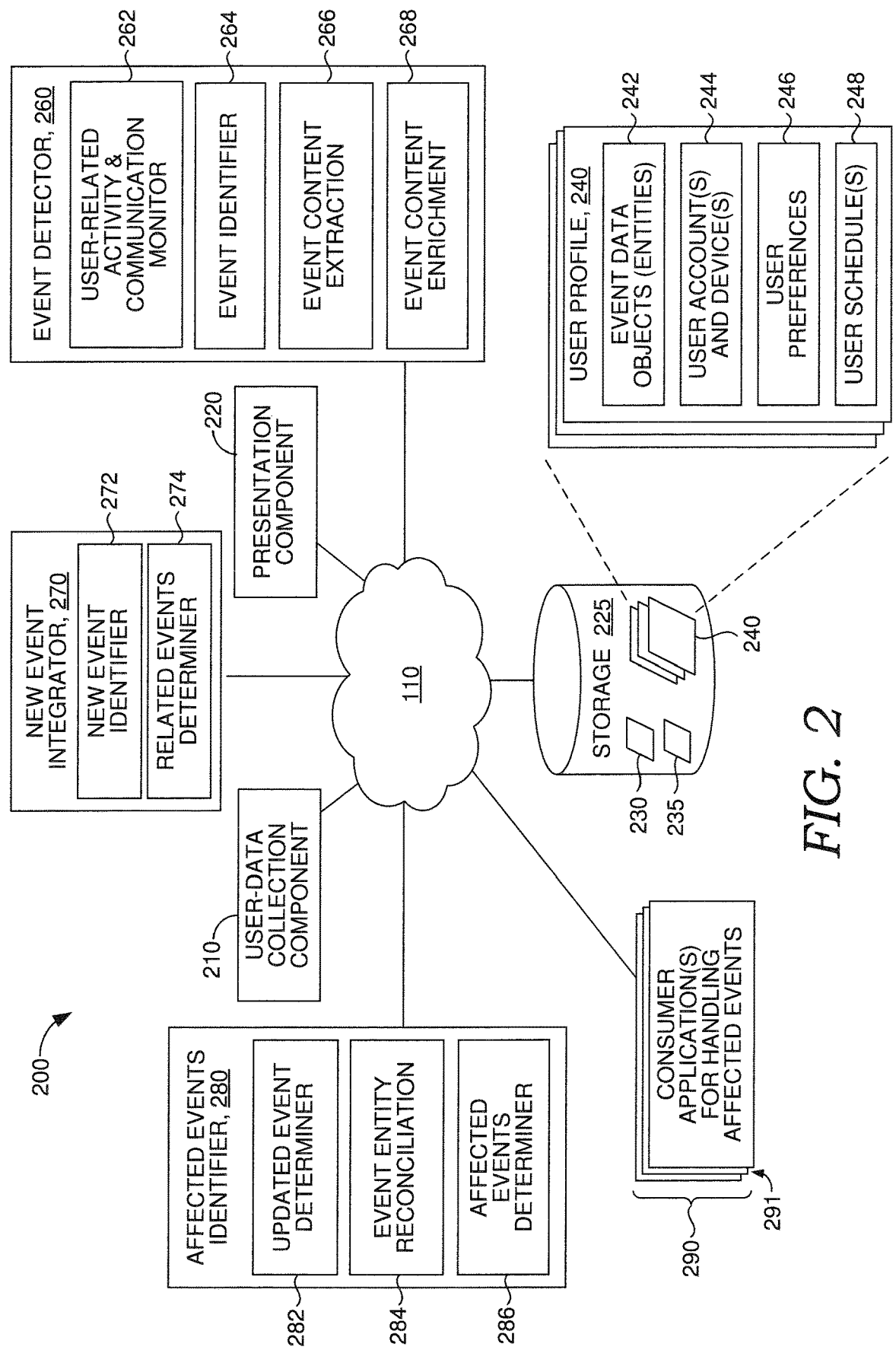
FIG. 2 is a diagram depicting an example computing architecture suitable for implementing aspects of the disclosure.

Operating environment 100 can be utilized to implement one or more of the components of system 200, described in FIG. 2, including components for collecting user data, monitoring user-related activity, detecting future events, extracting event content, reconciling or conflating event content information, determining affected events, or other functions carried out by components described herein. Operating environment 100 also can be utilized for implementing aspects of process flows 400 and 500, described in FIGS. 4 and 5, respectively.

Referring now to FIG. 2, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, storage 225, event detector 260, new event integrator 270, affected events identifier 280, and one or more consumer application(s) 290 for handling affected events. User-data collection component 210, presentation component 220, storage 225, event detector 260, new event integrator 270, affected events identifier 280, and consumer application (s) 290 may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of system 200 are associated with one or more personal digital assistant (sometimes referred to as "virtual assistant") applications, services, or routines. In particular, such applications, services, or routines may operate on one or more user devices (such as user device 104a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, or other abstraction layer(s), of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments, functionality of these components can be shared or distributed across other components.

Continuing with FIG. 2, user-data collection component 210 is generally responsible for accessing or receiving (and in some cases also identifying) user-related data from one or more data sources, such as data sources 104a and 104b through 104n of FIG. 1. In some embodiments, user-data collection component 210 may be employed to facilitate the accumulation of user-related data of user-related activity (including user-related communications) for event detector 260, new event integrator 270, or other components or subcomponents of system 200. The data may be received (or accessed), and optionally accumulated, reformatted, and/or combined, by user-data collection component 210 and stored in one or more data stores such as storage 225, where it may be available to the components or subcomponents of system 200. For example, the user-related data may be stored in or associated with a user profile 240, as described herein. In some embodiments, any personally identifying data (i.e., user-related data that specifically identifies particular users) is either not uploaded from the one or more data sources with the user-related data, is not permanently stored, is de-identified from any particular user, and/or is not made available to the components or subcomponents of system 200. In some embodiments, a user may opt into or out of services provided by the technologies described herein and/or select which user-related data and/or which sources of user-related data are to be utilized by these technologies.

User-related data may be received from a variety of sources where the data may be available in a variety of formats. For example, in some embodiments, user-related data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information, such as user-data, from a data source 104a, and may be embodied as hardware, software, or both. By way of example and not limitation, user-related data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; acoustic data such as sounds or user utterances, voice data such as automatic speech recognition or a transcription of user speech; activity logs; communications data including calls, texts, instant messages, and emails; website posts; other user-related data associated with communication events; other user interactions with a user device, etc.) including user activity that occurs over more than one user device, user history, session logs, application data, contacts data, calendar and schedule data, notification data, social network data, news and information sources (including popular or trending items on search engines or social networks, information sources such as flight-tracker websites), online gaming data, ecommerce activity (including data from online accounts such as Microsoft®, Amazon.com®, Google®, eBay®, PayPal®, video-streaming services, gaming services, or Xbox Live®), user-account(s)

data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User-related data can be received by user-data collection component 210 from one or more sensors and/or computing devices associated with a user. While it is contemplated that the user-related data may be processed, for example by the sensors or other components not shown, for interpretability by user-data collection component 210, embodiments described herein do not limit the user-related data to processed data and may include raw data. In some embodiments, user-data collection component 210 or other components of system 200 may determine interpretive data from received user-related data. Interpretive data corresponds to data utilized by the components of system 200 to interpret user-related data. For example, interpretive data can be used to provide context and other supplemental information to user-related data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user-related data and/or user-related data in combination with interpretive data for carrying out the objectives of the subcomponents described herein.

In some respects, user-related data may be provided in user-data streams or signals. A "user signal" can be a feed or stream of user-related data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Event detector 260 is generally responsible for detecting events related to the user. The term event is used broadly herein and may comprise any happening, occasion, incident, or event that is relevant to or otherwise associated with the user, such as a flight, hotel booking, rental car, dinner reservation, meeting, concert, performance, or other event, and may comprise a current or future event. Event detector 260 can monitor user-related activity or user-related communications, which may be received via user-data collection component 210, and generate an indication, such as a record, of the event. The indication or record may comprise event content, which may include extracted and/or supplemental information determined from the monitored user-related activity. In some embodiments, the indication may take the form of an event data object and may be stored in storage 225, in a user profile associated with the user, such as event data objects (entities) 242 in user profile 240. In some instances an event data object for a particular event may be referred to as an event entity (or simply entity). For example, suppose a user indicates that she will attend a birthday party through social media, the user-data collection component 210 may receive the user's indication, which can then be accessed by an event detector 260 in order to detect a future event (e.g., the birthday party) and generate an event data object (or event entity) corresponding to the event, which may be associated with the user and stored in storage 225.

In some embodiments, event data objects (entities) 242 may, on some occasions, include multiple event data objects corresponding to the same event, such as when an updated event is detected. For example, a future event may be detected, such as the birthday party, for which an event data object is created. As described herein, it may be determined that information about the event has been updated (perhaps through newly received user-related activity information, such as an email rescheduling the party). From this determination, an event data object may be created for the updated event information and may be stored in storage 225. The event data object for the updated event (which may be referred to herein as an updated event data object or simply updated data object) and the original object may then be reconciled. In some embodiments, once reconciliation occurs, one event data object is maintained for each event. Alternatively, in embodiments having parent and child entities, as described below, a child entity is maintained for each particular event.

As shown in example system 200, the event detector 260 comprises user-related activity and communication monitor 262, event identifier 264, event content extractor 266, and event content enricher 268. User-related activity and communication monitor 262 (hereinafter "activity monitor 262"), in general, is responsible for monitoring user-related activity, which includes user-related communications. Activity monitor 262 may access or receive user-related data from user-data collection component 210 or from storage 225, such as from a user profile 240, and monitor the user-related data in order to facilitate detecting an event. In some embodiments, activity monitor 262 may comprise a computer application or service running on a user client device (i.e., a user device) or the cloud, or both (distributed). Activity monitor 262 can provide aspects of user-related activity information to event identifier 264, where it may be analyzed to detect an event.

The term "user-related activity" is used broadly herein, and may comprise, by way of example and without limitation, user-related communications, including sent or received communications (e.g., SMS texts, email, which may include attachments or dynamic content, telephone conversations, voicemail, IMs, chats, social media messages, or other communication messages); online activity such as web-browser activity (such as a user providing an RSVP or making a reservation through an event service provider's website); computer application or mobile app activity; purchase or transaction activity, such as a credit card purchase (such as a user purchasing tickets to an event); social network or social media activity; voice-based interactions (e.g., when a user interacts with a virtual assistant), acoustic, image, or video information, which may be received via a sensor on a user device, such as a camera or microphone; or any other user-related data that may be received from user-data collection component 210. For example, a microphone on a user device may receive an aspect of user-related activity from the user's environment, such as an airport's announcement over an intercom in the user's background that a particular flight number is delayed. Similarly, a user might tell her virtual assistant that her flight is delayed and will not arrive until 7:30 PM. In some embodiments, the user-related activity may comprise information from multiple communications, which may be across different communication channels (e.g., email, text, voice call, or other communication channels), such as a back-and-forth chat with a booking agent or bot to make a reservation.

In some embodiments, activity monitor 262 can determine whether particular user-related activity (such as an event) is relevant to the user. User-related activity may be relevant to the user if the user is invited, included, listed, attending, or participating in a particular event. For example, user-related activity may be relevant to the user if the user creates an event or books reservations via a website, makes purchases, receives confirmation emails (e.g., the user's name appears as the passenger name in a flight confirmation email), or posts on a social media website (e.g., "see you there!" or the like). In one embodiment, the activity monitor 262 determines that the user-related activity is relevant to the user based on identifying an indication that the user will be attending or involved with the event (e.g., accepting a meeting invitation). In one embodiment, activity monitor 262 may determine, at least preliminarily, that communications sent or received by the user are relevant to the user. In some embodiments, user consent may be received before giving an activity monitor 262, or more generally event detector 260, access to the user's communications.

In some embodiments, activity monitor 262, or another subcomponent of event detector 260, may determine that a particular user-related activity is not relevant to the user. For example, activity monitor 262 may determine that the user is not associated with an event if the user responds to an RSVP as "not attending." It should be appreciated that, in some embodiments, activity monitor 262, or more generally event detector 260, may reference any user-related activity data or events (e.g., an event data object) to determine whether a particular user-related activity is relevant to the user.

Activity monitor 262 can provide user-related activity information to event identifier 264, where it may be analyzed to detect an event. Additionally, activity monitor 262 can store user-related activity in storage 225, such as in a user profile 240 associated with the user.

Event identifier 264, in general, is responsible for detecting events from user-related activity information. In particular, event identifier 264 may analyze aspects of user-related information, which may be determined by activity monitor 262 or received from activity monitor 262, user-data collection component 210, or storage 225, to detect an event, and in some embodiments, a corresponding event type. Event identifier 264 may detect whether the user-related activity indicates or is associated with an event. Where an event is detected, event identifier 264 can provide an indication of the detected event and, in some embodiments, information for the particular instance of user-related activity, to event content extractor 266. Additionally, event identifier 264 can store an indication that the particular instance of user-related activity is associated with an event (and in some embodiments, the event type) in storage 225.

In some embodiments, event identifier 264 may utilize one or more classifiers 230 to determine whether the user-related activity indicates or is associated with an event. More specifically, a classifier 230 may be applied by event identifier 264 to determine that a particular instance or instances of user-related activity (which may include user-related communications) indicates an event. For instance, one or more classifiers 230 may be applied by event identifier 264 to determine that an email (such as a reminder about a birthday party) is associated with an event, e.g., the birthday party.

In some embodiments, event identifier 264 and/or classifiers 230 may utilize features or attributes of the user-related activity information to determine whether the activity information indicates or is associated with an event and, in some embodiments, a type of event. For instance, a classifier 230 may utilize features, as further described herein, such key words, topics, location, dates, format, source of information, domain information, or other information associated with the user-related activity to detect an event and/or identify the type of the event. At a high level, and by way of example, the event identifier 264 may receive information from an email that is sent by an airline service provider and addressed to the user. The event identifier 264 can determine (e.g., utilizing one or more classifiers 230) based on certain features, such as a domain of the sender, key words within the body of the email or subject line, airport codes, reservation id/confirmation, passenger information, or other attributes that the email information is associated with an upcoming flight event.

Classifiers 230 generally comprise a set of logic, rules, conditions, associations, or classification models, which may include one or more machine learning (ML) classification models, or other criteria, to determine that information about one or more instances of user-related activity, indicates or corresponds to an event. For example, in some embodiments, one or more classifiers 230 may include a set of rules for analyzing information for a particular instance of user-related activity to detect a set of attributes or features that indicate a likelihood of an event (e.g., a flight number or a reservation-confirmation number). In some embodiments, classifiers 230 may comprise static rules (which may be predefined or may be set based on settings or preferences in a user profile associated with the user), Boolean logic, fuzzy logic, or may comprise one or more statistical classification models such as logistic regression, Naïve Bayes, decision tree, random forest, support vector machine, neural network, finite state machine, clustering, other machine learning techniques or similar statistical classification processes, or other rules, conditions, associations, or combinations of these classification techniques to detect an event. In some embodiments, different classification model(s) or techniques may be used for different types of events. Accordingly, one or more classifiers 230 can take many different forms depending on the mechanism used to detect an event and a particular user-related activity information from which an event is being determined. For example, one embodiment of classifiers 230 utilizes a logistic regression model, which provides an advantage of efficiency due to the simplicity of these models verses other classification models, which may be slower or require more computing resources.

In some embodiments, one or more classifiers 230 may determine, or may be used by event identifier 264 to determine, a likelihood of whether the instance(s) of user-related activity indicates an event. In some embodiments, the determined likelihood comprises a score or probability of detection and may be compared against a threshold to determine whether the instance(s) indicates an event. For example, in an embodiment, a threshold of at least 0.5 (or 50%, i.e., more likely than not) likelihood is utilized. In another embodiment, a threshold of at least 0.6 or 0.8, may be utilized. In some embodiments, one or more classifiers 230 may provide a threshold, or the threshold may be determined as a user setting or preference, such as in user preferences 246 in user profile 240.

For example, in embodiments of event identifier 264 that analyze user-related activity information for features indicating events, it may be expected that an email from an airline confirming a user's booking would have many features indicating a flight event (e.g., flight number, confirmation/reservation number, itinerary number, passenger name, airport codes, dates, times, airline name, airline-related or travel-related domain, or similar attributes associated with an email confirming the user's flight booking) and thus would be determined to have a high likelihood or score of being a flight event. The likelihood or score would exceed a threshold, if a threshold were utilized in this embodiment. Whereas another email from the user's friend describing her flight, although containing some features that may be indicators of a flight event, would likely be determined to have a lower likelihood or score because the email does not have associated with it nearly as many features indicating a flight event, or it does not have the particular determinate features (or combination or pattern of features) that would be utilized by a classifier 230 to determine a high likelihood of an event. In particular, a likelihood or score determined for this email from the user's friend would not satisfy the threshold, and thus the friend's email about her flight would not be detected as a flight event for the user.

In some embodiments, classifiers 230 can further be used to determine an event type or category for an instance(s) of user-related activity or user communication. For instance, in some embodiments, classifiers 230 comprise a set of classifiers, such that each classifier (or a subset of classifiers in the set) is used to detect a particular event type (or a likelihood of a particular event type). For instance, a first classifier (or subset of classifiers 230) might detect a flight event, another classifier 230 (or subset) might detect a car rental, and still another classifier 230 (or subset) may detect a general event that is not associated with a particular category. Still further, one classifier 230 (or subset) may detect a genus event and another classifier 230 (or subset) may detect a species event. Moreover, in some embodiments, each classifier (or subset of classifiers) may determine a score or likelihood that the instance(s) indicates a particular event type, such that the highest score or likelihood among the classifications is determined by the event identifier 264 to be the event category. (In some embodiments, all of the determined likelihood scores must satisfy a threshold, such that if no score satisfies the threshold, then no event (or event type) is detected.) For example, a set of classifiers 230 comprising a flight event classifier, a hotel reservation classifier, a car rental classifier, and a meeting event classifier may be applied, by event detector 264, to an email from an airline confirming a user's booking, and determine a likelihood of the email indicating the event that each classifier 230 is configured to detect, as: flight event: 0.9 likelihood; hotel event: 0.01 likelihood; car rental event: 0.09 likelihood; and meeting event: 0.2 likelihood. Thus, the airline email would be determined to be a flight event.

As described herein, the one or more classifiers 230 may be stored in storage 225, and may be utilized by the event identifier 264 to detect an event. It is also contemplated that in some embodiments, one or more classifiers 230 may be accessed and utilized by other components or subcomponents of system 200 in FIG. 2.

Event content extractor 266, in general, is responsible for extracting event content from a particular instance of user-related activity. Some embodiments of event content extractor 266 also may generate an indication or record of the event, which may comprise an event data object. Event content extractor 266 may receive, from event identifier 264, an indication that a particular instance of user-related activity is associated with an event (and/or a category of an event), for example, information about the event from an email or other user-related activity. Event content extractor 266 may then extract event content from information about the user-related activity. As described previously, event content generally refers to any information associated with an event, including but not limited to information about a service provider, location, name of event, date, event attendees, confirmation or reservation information, tracking or itinerary numbers, information specific to event types such as flight numbers, check-in/pick-up and check-out/drop-off times, agendas, or other details that are specific to a particular event.

In some embodiments, event content extractor 266 may utilize rules or logic to extract event content. For example, a set of extraction rules or logic may indicate specific aspects of event content that are relevant to a particular event and, thus, should be searched for and extracted. In one embodiment, the event content extractor 266 utilizes the event type and applies extraction rules or logic tailored to that category of event. For example, if an event is determined to be a flight event, the event content extractor 266 may apply flight event extraction rules to extract event content related to a flight event, such as a name of an airline, flight number, origin, destination, seat number, or similar flight-related event content. In this way, event content can be identified and extracted from the instance (or instances) of the user-related activity. While not necessary, in some embodiments, to conserve memory, the particular instance of user-related activity may be deleted or removed from storage 225 while preserving the extracted content. For example, if a particular instance of user-related activity is a video file, which requires a large amount of storage space, by extracting the event content from the video file, the video file can then be deleted or removed from storage and thus save memory within the computer storage.

Event content extractor 266 also may generate an indication or record of the event, which may comprise an event data object, and which may be stored in event data objects (entities) 242, a user profile 240, or otherwise stored and associated with the user. The term "data object" is used broadly herein and may comprise a record or set of records, data organized according to a data model (which may include a set of one or more data objects), a data structure, or template (which may be pre-defined and/or may be based on the particular category of event), a class object, a combination of these, or similar data structure. Accordingly, some embodiments of event content extractor 266 can generate an event data object (or an event entity) corresponding to a particular event that comprises the extracted event content from user-related activity information indicating or associated with the event. In some embodiments, event content extractor 266 may provide the event data object, or extracted event content, to event content enricher 268.

Event content enricher 268, in general, enriches event data objects, or the event content, with supplemental information that is relevant to that particular event. Supplemental information may include contextual information for the event that is not expressly included in a particular instance of user-related activity. For example and without limitation, supplemental information may include: enriched location-related content (e.g., determining geo-location from extracted content, such as determining city, region, latitude-longitude from airport codes for travel); contact information and other information about service providers associated with an event (e.g., a hotel's phone number, email, or website); or nearly any other information related to the event. In some embodiments, an event data object, extracted content corresponding to an event, or aspects of the user-related activity information associated with the event may be utilized by event content enricher 268 to generate supplemental information.

Supplemental information can be utilized by other components of system 200. For example, new event integrator 270 may utilize the supplemental information for determining whether an event is new or related to other events. Affected events identifier 280 may utilize supplemental information for identifying and reconciling updated or affected events. The supplemental information can further be utilized by the consumer application(s) for handling affected events 290, presentation component 220, or other components of system 200.

As a further example, supplemental information may comprise contextual information learned from an event. In some embodiments, rather than merely going to an external source to obtain additional information, contextual information may be determined or derived from the event content, which may still utilize external data sources. For instance, event content may include an address or the enriched location-related content may indicate an address. Event content enricher 268 may perform a semantic analysis on the address to determine information about the venue, such as that this address is a movie theater. Similarly, date-time information from the extracted event content may be used by event content enricher 268 to determine that the event involves a particular movie showing at the event time.

As yet another example, supplemental information may include friends or contacts of the user or other users who are attending the event. For instance, this may be determined by event content enricher 268 from user-related activity, and more specifically from event-related communications or activity (including initial or subsequent emails, messages, and/or social media activity), from activity monitored within a common domain, such as a company email address (e.g., multiple people received a similar flight event within the same company.com email), or from crowdsourcing.

In some embodiments, event content enricher 268 accesses external information sources related to the events or information in the events. For example, the event content enricher 268 may access websites or mobile applications to identify weather data (e.g., as weather may impact an outdoor event or a flight/travel event), traffic data, flight-tracker/monitor information, news, event-related websites (e.g., a website for the event or a website run by a service provider associated with the event, such as a wedding website for a wedding event or a band's website for a concert event), social media information, or the like.

Further still, content, including extracted and/or supplemental information, from other events related to the event may, in some embodiments, be used to enrich content about a first event. For example, if two related events include a meeting for 3 people that ends at noon and a lunch reservation for three people at 12:15 pm at a restaurant near the meeting location, then event content enricher 268 may infer that the three people from the meeting (which may be identified from the meeting invite) are the three people attending the lunch reservation, and this may be included as supplemental information for the lunch reservation event.

Based on determining the supplemental information, the event content enricher 268 may store the supplemental information in association with the event data object for a particular event, such as an event data object generated by event content extractor 266 or the event data objects (entities) 242 stored in a user profile 240 or more generally in storage 225. In one embodiment, event content enricher 268 may update an event data object with the determined supplemental information. Alternatively, in another embodiment, event content enricher 268 can generate a new, enhanced event data object, and the previously determined event data object may be deleted.

With continued reference to FIG. 2, system 200 comprises a new event integrator 270. New event integrator 270, in general, is responsible for processing newly detected events by determining a set of one or more events that are related to the newly detected event. Embodiments of new event integrator 270 first may determine that an event is new, in the sense that it does not correspond to a previously detected event, or that it does correspond to a previously detected event. In some embodiments, where an event is determined to be new, new event integrator 270 also may determine whether the new event is related to any previously identified event(s), thereby determining a set of related events.

More specifically, new event integrator 270 can receive information about the event, such as an indication of the event or an event data object for the event, which may be received from event detector 260, which detected the event, or from event data objects (entities) 242 of user profile 240 (e.g., a stored event data object). Event integrator 270 then may analyze the received information about the event and determine whether the event is new and/or whether an event is related to any other previously detected events or event data objects. In some embodiments, if the event is new, then event integrator 270 outputs a determination of any events related to the event, and may associate an indication of the relation with the new event and the related events.

Where an event is determined to be not new, that is, it corresponds to an already detected event, then it may be analyzed, such as by affected events identifier 280 or more specifically, updated event determiner 282, to determine whether it is an update to an already detected event. In some embodiments, event integrator 270 makes available information about an event which is not new (such as an event id or the event data object or similar indication of the event) to affected events identifier 280 or its subcomponents, where the event may be processed as an update to a previously identified event.

As shown in system 200 of FIG. 2, new event integrator 270 comprises a new event identifier 272 and a related events determiner 274. New event identifier 272 is generally responsible for determining whether an event is new, such as whether the event does not correspond to a previously identified event. In particular, new event identifier 272 can receive information about an event, such as an indication of the event or an event data object for the event, and can analyze the information to determine whether the corresponding event is new, such as by comparing the information to other information about the other, previously detected events associated with the user. In some embodiments, information about the previously detected events may be determined or received from event data objects corresponding to those events, which may be stored in a user profile 240 associated with the user, such as in event data objects (entities) 242.

In some embodiments, new event identifier 272 performs the analysis to determine whether a detected event is new by comparing a set of features or attributes of the newly detected event to features or attributes of previously detected events associated with the user. The event features or attributes may be determined from the extracted (or enriched) event content or from an event data object corresponding to the event. In some embodiments, rules or logic, such as Boolean logic, are used to determine if the information about a newly detected event, which may be received from an event data object corresponding to the newly detected event, is similar to information from an existing (already determined) event data object, and therefore the newly detected event is not new. In some embodiments, the rules or logic may comprise a feature similarity analysis. For instance, feature similarity may be determined between event data objects, such as by using clustering, nearest neighbor, or similar technique, and a similarity score determined based on the similarity of event attributes. Where the similarity score satisfies a threshold, this implies the newly detected event is sufficiently similar to a previously detected event, and thus is not new. It should be appreciated that, in some embodiments, new event identifier 272 may utilize the enriched information from event content enricher 268 to increase the accuracy of identifying whether an event is new.

In one embodiment, new event identifier 272 may first identify a particular event category and then analyze event data objects associated with that particular event category for similar or matching attributes. For instance, if the newly detected event is a hotel booking, new event identifier 272 may check all the previously logged hotel booking event data objects (entities) and determine whether they have similar or identical attributes. If there is no match, then it may be determined that the newly detected hotel-booking is a new event that has not previously been detected. New event identifier 272 may store an event data object corresponding to the event in storage 225, such as event data objects (entities) 242. Additionally, new event identifier 272 may provide its determination to related events determiner 274, so that events related to the newly detected event may be determined. On the other hand, if there is a match, then it may be determined that the newly detected event corresponds to an event already detected (i.e., it is not new), and as described elsewhere herein, information about the event may be evaluated by other components of system 200 to determine whether it comprises updated information for a previously detected event.

Related events determiner 274 is generally responsible for determining that two or more events are related. As described herein, an event may be related to another event, for example, based on one or more attributes (or features) that are in common or similar between the two events, such as location, date/time, or other attributes described herein. For example, a flight event may be related to a hotel booking event because the flight destination is near the hotel location, and the flight landing date is the same as the hotel check-in date. Related events determiner 274 may receive information about events from the new event identifier 272 (such as a data object that is determined to be new) or from storage 225, such as event data objects (entities) 242. Related events determiner 274 then may perform a comparison of event attributes to identify a set of events having similar or related features.

In some embodiments, related events determiner 274 may utilize related-event logic 235 to determine a set of related events. For example, related events determiner 274 may receive a flight data object and utilize related-event logic 235 to determine that the event (i.e., the flight to a destination city) is related to event data objects associated with other events, such as a hotel booking, dinner reservation, or car rental in the destination city. These event data objects (again, also referred to as event entities) may be indicative of a user's upcoming trip.

Related-event logic 235 generally comprises a set of logic, rules, or classifiers that can be used to determine if an event entity is related to (and/or dependent from) another event entity. In some embodiments, related-event logic 235 may comprise instructions (which may be carried out by a component of system 200, such as related events determiner 274) to analyze one or more attributes of an event entity, such as its location attribute, time attribute, attendance attribute, event category attribute, or other attributes to determine if two or more event entities are related. In some embodiments, related-event logic 235 may comprise (or utilize) a predefined related events template or predefined set of events for determining that events are related, as described below.

In some embodiments, related-event logic 235 may comprise logic regarding a similarity (or dissimilarity) in a location attribute, where a similarity in the location attribute may lead to a determination that events are related to and/or one event is dependent on the other. For example, events happening within a particular distance or geolocation may be indicative that event entities are related. For instance, a conference event entity having a location attribute of San Diego may be related to a dinner reservation entity in downtown San Diego, as both events occur within a geographic region or share a similar location (i.e., San Diego). However, a reminder to call a dentist may not be related to the conference event entity if the dentist's office is located in Bellevue. Thus, the reminder to call the dentist would not be determined to be related to the conference event entity as there is a dissimilarity in the location attributes of San Diego and Bellevue.

In one embodiment, related-event logic 235 may comprise logic specifying that event entities with temporal attributes occurring within a particular time interval leads to a determination that the events are related and/or dependent. For example, related-event logic 235 may comprise rules that specify event entities having time attributes that are within a timeframe (such as events occurring on the same date, within a 24-hour interval, within eight hours, or within thirty minutes of each other) are more related than event entities having time attributes that are further apart (such as events that are separated by one or two months). In some embodiments, the time interval may be predetermined, such as 24 hours. In other embodiments, the particular event type(s) may be utilized by related-event logic 235 to determine a timeframe or time interval for evaluating and determining relatedness. For example, a 24-hour time interval may be utilized when determining that a hotel reservation event is related to a flight event (e.g., the hotel check-in is within twenty-four hours of the flight arrival time), while a six-hour interval may be utilized to determine that a dinner reservation event is related to a meeting.

Similarly, related-event logic 235 may comprise rules that specify a second event happening within a timeframe, such as within 24 hours of a first event, may be defined as being related to that first event. Additionally, in some embodiments, these later-in-time events may be considered dependent on the first event. For instance, if a later-in-time event occurs within 24 hours of a prior event, then the later-in-time event may be determined to be related to (and dependent from) that prior event. In some embodiments, related-event logic 235 may comprise logic regarding particular event types occurring within a specific time frame. For example, if hotel reservation entity and car rental entity are associated with a time/date that occurs between time/dates of an initial and returning flight (specifically between a flight from an origin and back to the origin), then related-event logic 235 can lead to a determination that the three entity types are related.

Further, in some embodiments, related-event logic 235 may comprise logic regarding a proximity (or non-proximity) of temporal or time attribute to determine whether events are related to and/or dependent on each other. For instance, in some embodiments, two event entities having a similar time or date may be indicative that those two event entities are related and/or dependent. For example, related-event logic 235 may comprise rules that event entities having time attributes that are closer together (such as events occurring on the same day or within 30 minutes of each other) are more related than event entities having time attributes that are further apart (such as events that are separated by one or two months).

Still further, in some embodiments, related-event logic 235 may comprise logic regarding a similarity (or dissimilarity) in attendance attribute to determine whether events are related to and/or dependent on each other. In one embodiments, related-event logic 235 may comprise rules that specify that event entities having similar attendees indicates the events are more likely to be related, as opposed to event entities having dissimilar attendees. For example, an event entity associated with an email meeting invitation sent to three people may be determined to be related to an event entity associated with a dinner reservation confirmation email, based on the similarity in number of attendees (i.e., three) or names of attendees.

In some embodiments, a predefined related events template or predefined set of events is utilized for determining that events are related to and/or dependent on each other. In this way, two or more event entities may be determined to be related and/or dependent if related-event (entity) logic 235 includes predefined relationships indicating that they are related. For example, a trip events template may comprise a flight event entity, a hotel event entity, or a car rental event entity. If two or more of these event entities are present, related-event (entity) logic 235 may include a rule or condition that indicates that these events are related. Similarly, related-event logic 235 may include a rule that specifies conditions where entities are not related. For example, a rule may specify that a teleconference meeting entity is not related to the flight entity, hotel reservation entity, or car rental entity. Additionally, in some embodiments, a predefined related events template may specify event dependency. For instance, a car rental entity may be specified as being dependent on a flight entity, where the flight lands on the same date and similar geographic location as the car rental. Similarly, a lunch reservation entity may be determined to be dependent on a meeting event entity where both events occur on the same date and have similar attendees.

In some embodiments, related-event logic 235 may specify that a combination of the temporal, location, attribute-similarity, or other attribute conditions is utilized to determine relatedness and/or dependency. For example, a hotel event entity may be determined to be related to a flight entity where certain conditions about the location-related and time-related attributes are satisfied, such as the locations of the flight destination and hotel are similar and a hotel check-in date attribute is the same as a flight arrival date attribute. Moreover, in some embodiments, related-event logic 235 determines a likelihood that two (or more) events are related. In particular, one or more rules, logic, models, or conditions, such as described herein may be evaluated to determine on overall likelihood or relatedness score that two events are related. A relatedness threshold may be utilized to determine relatedness for two events having a determined relation that satisfies the relatedness threshold. For instance, a relatedness threshold of 0.5 (or more likely that not) may be utilized. (In some embodiments the relatedness threshold, and other thresholds described herein may be configured by a user in user preferences 246.) In this way, two events that have multiple aspects indicating relatedness (i.e., multiple degrees of relation) are thus more likely to be determined as related than two events with only one degree of relation. In some embodiments, this degree of relation may be utilized when surfacing affected events to a user that may be affected by a change in user circumstances. For instance, only those event entities having a higher degree of relation may be provided to the user, or may be ranked or ordered based on the degree of relation.

In some embodiments, related-event logic 235 may specify using an iterative process. For example, related-event logic 235 may instruct to initially use a first geographical area or time interval, and then expand in subsequent interactions.

In one embodiment, related-event logic 235 may specify the application of a clustering process of various attributes. For example, related-event (entity) logic 235 may cluster events based on geo-location, time, or other attributes that are in-common (e.g., event name or theme like a conference name), similar, or within a threshold distance apart (e.g., within the same geographic region or on the same day). In some embodiments, clustering includes both the location attribute and time attribute (or another dimension).

In some embodiments, where related-event logic 235 is used to determine related events, related events determiner 274 may further determine an event dependency. In other words, the related events determiner 274 may determine an organization of the related events based on their dependency (e.g., their relationship to each other). For instance, in the trip example above, the event entities for the hotel booking, dinner reservation, or car rental may depend from the flight. Similarly, the dinner reservation may depend from the car rental. As a further example, a teleconference meeting having call-in information that is scheduled during the user's trip may not depend from any of the event entities for the hotel booking, dinner reservation, car rental, or flight, since the teleconference meeting would not include a location attribute as the user can attend the meeting by simply calling in.

In some embodiments, dependency may be determined as a later event following a related earlier event. Thus the hotel event entity would be determined to be dependent on the flight entity. In other embodiments, dependency may be determined based on the first event of the related events to be detected; for instance, a lunch reservation event occurring before a meeting event may be determined to be dependent on the meeting event (i.e., the lunch reservation entity may be determined to be related to the meeting event entity), where the meeting event was detected first (i.e., before the lunch event). Still further, in some embodiments, rules or conditions may specify dependency based on event type. For example, a rule may specify that, where a car rental and flight are determined to be related, the car rental entity is dependent on the flight entity, or that where a dining reservation and meeting entity are determined to be related, the dining reservation is dependent on the meeting. Accordingly, it should be appreciated that a dependent event does not necessarily follow an event from which it depends. For instance, a first event entity associated with a planning dinner (e.g., a planning dinner to prepare for a work presentation) and a second event of the work presentation itself, which occurs three days later. If the work presentation is cancelled or postponed, then the planning dinner may also need to be cancelled or postponed. Accordingly, the planning dinner event is dependent on the work presentation event. In some embodiments, the set or listing of related events may be determined and provided, such as by related-event logic 235 or related events determiner 274, as a hierarchical tree structure, a list or sequence, or table that indicates which events are dependent on the given/first event, which events the given/first event is dependent from, and/or in some instances a degree of dependence.

Continuing with related events determiner 274, in some embodiments, related events determiner 274 may determine and provide a set of related event data objects (event entities), or an indication of related events, such as a set of event IDs, for a given event entity. For instance, where a newly detected event is determined to be new, by new event identifier 272, related events determiner 274 may determine a set of event entities related to the new event. In some embodiments, the set of related events (or related event entities) comprises the detected events for a user that are determined to be related.

Information about the set of event entities that are related to a particular event, such as the newly detected event, may be stored in association with the event data object corresponding to that event. In some embodiments, each related event data object can be updated so that it includes an indication of related events. More generally, in some embodiments, information about related events may be included in an event data object for the event, such as a listing or tree of event IDs, or other indication of other events related to the events. In some embodiments, information about related events may be stored external to the event data object, such as in a database or table indicating related events by event ID. For example, suppose a user is taking a business trip that includes a flight event, hotel booking, car rental, and dinner reservation, the event data objects for these events can be associated with each other, such as by storing related event IDs in the event data objects for each event, thereby forming a set of related event entities.

In some embodiments, a set of related events (or event data objects) may define a "parent entity" which, in some instances, may further include additional information about a set of related events. For example, a parent entity may correspond to the user's business trip, and include multiple, related "child" events, such as flights, car rental, hotel reservation, or the like. In this way, individual, related event entities may be considered "children" of a parent to which they belong. In some embodiments, a child may be a member of more than one parent entity. Moreover, in some embodiments, multiple parent entities may be related and also children of another parent entity (i.e., three levels).

In some embodiments, a parent entity may comprise a logical association of the related child events. In some embodiments, a parent entity may have a corresponding event data object. For instance, in an embodiment, upon determining by event data objects (entities) 274 that a first event is related to a second event, a parent entity event data object may be created and stored in event data objects (entities) 242. (Thus, in this example, there are three event data objects for the two related events: each event has its own data object, and the third event data object is a parent entity data object for the two related events.) In some embodiments, a parent entity may have its own data structure, such as a data model for parent entities, and/or may have an ID or other indication indicating that it is a parent entity. In some embodiments, a parent entity comprises a directed graph, a relational database entry, or set of pointers that identify the child entities that are related.

The content in the parent entity may include content from child events, or may include additional content. In some embodiments, parent entity content may be enriched by event content enricher 268. For example, content in a parent entity may comprise information about other people related to the parent entity (e.g., other family members also going on vacation), weather information relevant to each child event, or other additional, available information relevant to the child events, such as, without limitation, themes, agendas, attendees, project names, company(ies), and/or billing numbers/accounts/credit card, which may be associated with expenses for each child event.

With continued reference to FIG. 2, example system 200 includes affected events identifier 280. The affected events identifier 280 comprises an updated event determiner 282, event entity reconciliation 284, and affected events determiner 286. Affected events identifier 280 is generally responsible for determining which related events (if any) may be affected by an update to a particular event. The term update is meant to be interpreted broadly, as it may refer to an actual update, such as a change in event content that was previously stored in the event data object. For example, an event update may comprise a change in time(s), flight(s), location(s), hotel(s), number of people, or other attributes. Additionally or alternatively, the term update may refer to new information about an event. For example, the term update may refer to a flight departure gate number that was not previously stored in a flight data object. In some instances, update information may be received user-data collection component from the user. For example, a user might tell a virtual assistant that her flight is delayed and will not arrive until 7:30 PM. Subsequently, information regarding affected events may be determined according to embodiments of affected events identifier 280 described herein, and, for instance, the virtual assistant may then provide information about affected events.

Affected events identifier 280 may also merge the update data, which may be received from an event data object corresponding to the update (sometimes referred to herein as an update entity) with the information from an event data object corresponding to the event(s) to which the update applies (sometimes referred to herein as an existing entity or existing event entity). For example, a friend emails the user and gives some additional information regarding an upcoming birthday party. Content from the email may be analyzed by affected events identifier 280 to determine that the email is regarding a previously identified event (i.e., the birthday party). The event content for the previously identified event may be modified or supplemented with the new content from the email. More specifically, in some embodiments, content from the friend's email (such as an event data object created from the email by event detector 260) may initially be evaluated by new event integrator 270 to determine that the email does not correspond to a new event. Since the email is not a new event, affected events identifier 280 may identify any existing events (or the corresponding existing event entity(ies)) for which the email content regards thereby determining that email content is an update to a previously identified event, and may merge or reconcile content from the update (the friend's email) to the existing event entity(ies). Thus, the new information about the birthday party is added to the existing event data object (the event entity) for the birthday party event. In this way, the update data may be merged with the existing data into a single event data object corresponding to the event. It is contemplated that merging or reconciling the update data may include modifying an existing data object or generating a new data object.

As mentioned, affected events identifier 280 comprises updated event determiner 282, event entity reconciliation 284, and affected events determiner 286. Updated event determiner 282 is generally responsible for determining that event content for an event comprises an update for one or more previously identified event(s) (or event data object(s)), and which of the previously identified event(s) (or event data object(s)) the update regards. In particular, event content or an event entity (i.e., an event data object, which includes event content) that has been determined by new event integrator 270 not to indicate a new event may be analyzed by updated event determiner 282 to determine a set of one or more existing event entities corresponding to previously identified events for the user, for which the event content (or event entity) regards, which thereby also determines that the event entity comprises an update entity.

Although, according to the example depicted in system 200, new event integrator 270 may determine that an event data object does not correspond to a new event, and updated event determiner 282 may determine that an event comprises an update and which event data object(s) should be updated, it should be appreciated that in other embodiments, determining that an event is an update and/or determining which event(s) should be updated may be performed by either updated event determiner 282 or by new event identifier 272 (or more generally by new event integrator 270 or affected events identifier 280).

In some embodiments, updated event determiner 282 may determine a set of existing event entities that an update regards by comparing features or attributes of the update entity with the existing event entities, which may be received from event data objects (entities) 242. Attributes or features of a particular entity can be compared to other entities, and where identical or similar attributes are determined, then the particular entity may be determined to be an update entity. For example, where a particular entity has identical confirmation/reservation numbers, dates, location, event name, or other attributes as an existing entity, the particular entity may be determined to be an update entity that may comprise content to be merged or reconciled with an existing event entity.

In some embodiments, rules or logic, such as Boolean logic, may be used to determine if the update entity regards an existing entity. For instance, a rule or logic may specify that where an update entity has a flight confirmation number that is identical to a flight confirmation number in an existing event entity, then the update entity regards the existing entity. Similarly, a rule or logic might compare an update entity with existing event entities of the same event type, and then determine whether attributes in the update entity match attributes in the existing event entities of that type, in order to determine the specific existing entity for which the update regards. As described previously, the attributes or features used for the comparison may comprise extracted or supplemental event content. In some embodiments, feature similarity between the entities may be determined using clustering, nearest neighbor, or similar process and a similarity score determined based on the similarity of entity attributes. Where the similarity score satisfies a threshold, the one or more entities may be determined to be associated with the update entity. For instance, updated event determiner 282 may determine that an update entity indicating a delayed flight is similar to an existing event entity for a flight event based on identical origin or destination city, airline name, flight number, or other attributes. In some instances, the event content for a newly detected event may be sparse, which may result in a lower confidence about a determination that the event is a new event or an update to an existing event. In some embodiments, when these situations occur, a user may be prompted to confirm whether the event is new or an update, and in some further embodiments where the event is an update, the user may identify the existing event that the update regards, or confirm that the update should be applied to an existing event.

Event entity reconciliation 284 is generally responsible for reconciling information from an update entity and information from existing event entities for which the update regards. As explained above, the set of one or more existing event entities may be determined by updated event determiner 282. In some embodiments, the update entity may be reconciled with existing event entities by conflating event content information between the update entity and the existing entity, which may include enriched data. In one embodiment, attributes (or data fields for an attribute in an event data object) can be compared between the existing entity and the update entity. If either entity has any information that is missing from or conflicting, then event entity reconciliation 284 may import the missing information or modify the conflicting information. For instance, the content in the existing event entity may be modified based on the content from the update entity. The modification may comprise changing existing attributes in the existing event entity or adding to the existing event entity additional or new information from the update entity.

The update entity information may be prioritized over information in the existing entity and, thus, may replace the existing entity attribute(s). For example, if an existing entity corresponding to a flight event (the existing entity) comprises an arrival time attribute, and a update entity includes information indicating arrival time that conflicts with the arrival time attribute in the existing entity, the updated arrival time attribute may be prioritized over the existing arrival time attribute and, thus, replace the existing arrival time within the existing entity for the flight event. Additionally, if the update entity comprises information that is missing from the existing entity, the missing information can be incorporated into the existing entity. Similarly, if the existing entity comprises information that is missing from the update entity, the missing information may be incorporated into the update entity. Continuing with the example, if the update entity includes a gate number attribute that was not included in the existing entity for the flight event, the gate number attribute may be incorporated into the existing flight entity. In one embodiment, the existing entity may be preserved, and the update entity may be deleted after reconciliation. In another embodiment, the update entity may be preserved, and information from the existing entity that is not modified from the update may be included in the update entity, so that the existing entity may be deleted after reconciliation. In still another embodiment, a new event entity may be generated from the content from two or more entities having information to be reconciled.

In some embodiments, a user may be prompted that the update entity (or the user-related activity associated with the update entity) appears to be an update to a previously identified future event. For example, the user may be prompted that an email including an agenda for a conference appears to have information for an updated conference room. In some embodiments, a user may be able to view indications of the events (or data entity objects) via a graphical user interface (GUI), and the updated information may be shown in a different color, highlighted, or otherwise distinguished to enable a user to differentiate the updated information from the previous or original information.

It is contemplated that, in some embodiments, after event entity reconciliation 284 reconciles an update entity with one or more existing event entities, the newly updated event entity(ies) may be reevaluated to determine relatedness to other existing event entities, such as described in connection to related events determiner 274.

Affected events determiner 286 is generally responsible for determining events that may be affected by an update. In particular, embodiments of affected events determiner 286 may determine a set of one or more events (or event entities) associated with the user that are impacted by an update or impacted by a change due to an update event. For example, if a user's flight is delayed, one embodiment of affected events determiner 286 may determine that the user's rental car reservation event will be impacted, but a related hotel reservation event will not be impacted by the delay.

At a high level, some embodiments of affected events determiner 286 may determine the set of events affected by an update according to the following procedure: first determine a set of one or more event entities that are modified due to event entity reconciliation. This may comprise the set of event entities acted on (or that were otherwise modified) by event entity reconciliation 284 when reconciling information from an update entity and one or more existing event entities. Next, for each event entity that was changed during reconciliation (i.e., for each of the modified event entities, from the set of event entities that were modified due to reconciliation), determine the set of events related to that changed event entity. Then, for each event entity that was changed during reconciliation, determine the impact of the changes from the changed event entity on its set of related event entities. In some embodiments, the impact may be determined by detecting a conflict (or likelihood of a conflict) between the features or attributes of the set of related entities including the changed event entity. Thus a conflict may indicate that the particular conflicting event is affected by the update event.

Continuing with the above example, suppose a user's flight is delayed, an embodiment of affected events determiner 286 may determine that the user's rental car reservation event will be impacted because an attribute specifying a pickup-time window expires before the flight arrival time indicates the flight will land. (The flight arrival time may be specified as an arrival time attribute for the now updated event entity for the flight.) Accordingly, affected events determiner 286 may determine a likely conflict based on the values of these time-related attributes. However, affected events determiner 286 may determine that another related event—a hotel reservation—is not to be impacted by changes from the flight delay because the flight arrival time is still on the original date that the user checks into the hotel. For instance, an attribute specifying a hotel check-in time frame does not conflict with and occurs after (or continues after) the arrival time attribute.

In some embodiments, based on the likelihood of a determined conflict, the impacted (i.e., affected) event may be identified and an indication of the event provided to a consumer application(s) 290 for handling affected events. (For example, as described in connection with consumer application(s) 290, a user may be notified or the affected event, or a computing service may facilitate modifying or canceling the affected event.)

In some embodiments, affected events determiner 286 determines a score or likelihood that an event entity is affected. The score or likelihood may be determined based at least in part on the particular attribute(s) that are changed (e.g., a temporal attribute, location attribute, attendees attribute, or other attributes associated with the event entity), and/or how relevant the change is to the attributes associated with the set of related events. For example, a change in a gate number for a flight entity may not be relevant to a check-in time for a hotel because the change in gate number might not affect the destination city or arrival time. However, a change in a destination city (e.g., perhaps the plane is rerouted to a different airport due to the destination airport closing because of a snow storm) may be relevant to a check-in time for the hotel because the change would be relevant to a hotel reservation in the original flight destination.

In some embodiments, the score or likelihood that an event is affected may be based on which attributes have changed and whether the change has caused the related event to become impractical for the user to complete. For example, depending on the change in a time attribute, attendees attribute, location attribute, or other attribute, it may result in the related events becoming impractical or impossible, and thus resulting in a higher likelihood of a conflict. For instance, if a meeting location is changed from an office in downtown Bellevue, to just outside of downtown Bellevue, such as in the Crossroads, affected events determiner 286 may determine a lower likelihood that the lunch reservation in downtown Bellevue would be affected since the lunch in downtown Bellevue may still be possible due to its proximity to the new meeting location. However, if a meeting location is changed to downtown Seattle, which is much further from downtown Bellevue than the Crossroads, then there might be a higher likelihood that lunch in Bellevue would be affected since the lunch in downtown Bellevue may be impractical due to traffic or travel time. In some embodiments, one or more event entities in the set of related events may be affected if a change has caused a direct conflict in one or more attributes (e.g., a flight delay having a later arrival time that now conflicts with a dinner reservation).

In some embodiments, affected events determiner 286 may generate an indication of one or more affected events for display on a GUI to notify the user. In some instances, an indication of a cascading set of events may be provided, including one or more events that are likely to be affected. Based on user input, one or more of the affected events can be modified or rescheduled. Additionally or alternatively, affected events determiner 286 may provide an indication of an affected event(s), that is more likely to be immediately impacted, based on an event occurring within several minutes to 24 hours. Based on user input, affected events determiner 286 can provide other related events to allow the user to select an event to be modified.

Referring still to FIG. 2, the system 200 may comprise storage 225. Storage 225 generally stores information including data, computer instructions (e.g., software program instructions, routines, or services), logic, profiles, and/or models used in embodiments of the disclosure described herein. In an embodiment, storage 225 comprises a data store (or computer data memory). Further, although depicted as a single data store component, storage 225 may be embodied as one or more data stores or may be in the cloud. Some embodiments of storage 225 store one or more classifiers 230 (as described in greater detail in reference to FIG. 2), related-event logic 235 (as described in greater detail in reference to FIG. 2), or user profile 240.

Example user profile 240 may generally include information associated with a particular user or, in some instances, a category of users. At a high level, user profile 240 may store information about events, information about user accounts or devices, and information regarding a user's schedule. As shown, user profile 240 comprises event data objects (entities) 242, user account(s) and device(s) 244, user preferences 246, and user schedule(s) 248. The information stored in user profile 240 may be available to the routines or other components of example system 200.

Event data object (entity) 242 is generally an organization of information about an event. Event data object (entity) 242 may be determined or generated by event detector 260, and may comprise extracted content from one or more instances of detected user-related activity or user-related communications. Event data object (entity) 242 may also include enriched content determined or generated by event content enricher 268.

The term "data object" or "entity" is used broadly herein and may comprise a record or set of records, data organized according to a data model (which may include a set of one or more data objects), a data structure, or template (which may be pre-defined and/or may be based on the particular category of event), a class object, a combination of these, or similar data structure. For instance, in some embodiments, the data structure may comprise a pre-defined structure for each event type or may be defined from a data structure template or data model. Alternatively, the organization of the data in the data object may be defined as needed.

In some embodiments, event data object (entities) 242 may comprise data about an event (which may comprise the extracted content and/or the enriched content) that is organized into a data model. In particular, in some embodiments, each type or category of event may have a corresponding data model (e.g., flight event, hotel reservation event, car rental event, or the like), including particular attributes associated with that type of event. In some instances, a generic model may be utilized for events that do not have a corresponding category. In one embodiments, the generic model may comprise common event attributes that are likely to exist for an event, for example and without limitation, event attributes such as event ID, date-time(s), location(s) information, event name, reservation/booking/confirmation number, event service provider name, service provider contact information, or related-event(s) information.

In some embodiments, the content in the event data object 242 may be stored in a logical and/or physical arrangement, and may be organized as a table, tree, a key-value pair, such as a JSON object, or other appropriate structure, which may be determined based on the category of event and/or the content about the future event that is available.

In some embodiments, each event data object 242 includes an event ID that identifies the event. The event ID may be assigned when the event is determined to be a new event, such as by new event integrator 270. In some embodiments, an event data object (entity) 242 may comprise information about one or more related events. For example, in an embodiment, each event data object 242 may include a data field or data entry listing event IDs for related events. In some embodiments, the related event IDs may be organized chronologically or according to a determination of dependency from other related events, as described in connection with related events determiner 274 and related-event logic 235. In some embodiments, the data field or entry may comprise an array of event IDs corresponding to the related events. Alternatively or in addition, in some embodiments, a separate database or record may be utilized to track related entities or events. For example, in some embodiments, the table comprises a listing of one or more event IDs, and for each event ID, a set of related event IDs.

User account(s) and device(s) 244 generally comprises information about user accounts associated with the user and/or user devices (e.g., laptop, phone, or smart speakers/watches) accessed, used, or otherwise associated with the user. For example, user account(s) and device(s) 244 may include information for online or cloud-based accounts (e.g., email, social media) such as a Microsoft® Net passport, other accounts such as entertainment or gaming-related accounts (e.g., Xbox live, Netflix, online game subscription accounts, or the like.); user data relating to such accounts such as user emails, texts, instant messages, calls, other communications, and other content; social network accounts and data, such as news feeds; online activity; calendars, appointments; application data, such as calendar applications or financial applications; financial account information, such as bank account information that can be used to view purchase history, credit card account information, or any other data that may can be used to identify financial transactions; or the like. Some embodiments of user accounts and devices 244 may store information across one or more databases, knowledge graphs, or data structures. In some embodiments, user-data collection component 210 or activity monitor 262 may use account or device information to obtain user-related activity and detect events. Further, as described herein, other components of system 200 may utilize the user account(s) and device(s) 244 to perform their respective operations.

User preferences 246 generally include user settings or preferences associated with the user. By way of example and not limitation, such settings may include user preferences regarding whether and how the events (e.g., affected events) are used or handled; configurations for thresholds or detection sensitivity described herein; configurations for notifications associated with the events, such as notifications regarding updates to events or notifications about affected events; or the facilitation of affected events, including whether the user desires to have their virtual assistant automatically reschedule events, cancel the events, or merely notify the user. User preferences 246 may also enable a user to specify which user-related activity, communications (e.g., email domains/addresses, IM/chat, or the like), user devices, or other sources of information are accessible to the user-data collection component 210 or monitored by event detector 260.

User schedule 248 is generally a record(s) of the user's likely schedule. In some embodiments, user schedule 248 is a shadow calendar of the user's schedule. That is, it may represent the user's complete, likely schedule based on all detected events and/or calendar-related data (i.e., a master calendar or schedule), which may even include travel/commute times or similar events that are not explicitly identified as events or included on the user's calendar(s). In one embodiments, user schedule 248 may comprise a logical schedule (e.g., assembled as needed from date-time information taken from event data objects (entities) 242). In some embodiments, while user schedule 248 may include similar information as a calendar tied to a user's account (e.g., Microsoft Outlook® Calendar), it may include information that is well beyond that which is included any particular calendar since the user schedule(s) may be used for identifying expected conflicts if a user's circumstances change. Even more, the user schedule(s) 248 can be utilized for presenting schedule-like information to the user, such as proposed modifications to future events.

Continuing with FIG. 2, example system 200 may comprise one or more consumer applications for handling affected events 290. Consumer applications 290 may comprise one or more computer programs, routines, applications, or services that utilize the determined affected events due to a change in circumstance (or utilize other aspects of determinations performed by the components of system 200). For instance, one example of a consumer application 290 comprises a service to facilitate the handling of affected events or impact due to the change in circumstances, which may include the update event or an event impacted due to the changes in the update, as further described below. In some embodiments, a consumer application 290 may be considered one example of an application or service (or set of applications or services) that may consume information about the event as determined by implementations of the present disclosure.

At a high level, a consumer application for handling affected events 290 is generally responsible for handling the affected event or mitigating the impact of the changes in the user's circumstances on the affected event. In some embodiments, a particular consumer application 290 may provide a resolution service to facilitate the handling of the affected event(s). A resolution service may comprise, for example, providing information about the affected event, such as surfacing the affected events to the user (such as described in connection to presentation component 220), providing information to an application or service of the user (such as a calendar or scheduling application), or providing information as part of an API where it may be consumed by yet another application or service.

Some embodiments of a consumer application 290 comprise functionality enabling a user to query the application (or a virtual assistant) regarding any affected events from a change in circumstances. In some embodiments of consumer application 290, information about an affected event may be included in a notification. The notification may comprise information about or indicating the affected event, a reminder, a recommendation or suggestion (e.g., a recommendation to cancel or modify the affected event), a request (e.g., a request for an affected event to be rescheduled or cancelled, which may be provided to a service provider associated with an event) or communication-related data (e.g., an email, instant message). For example, embodiments intelligently route user communications, schedule reminders, or provide notifications or other content to the user (or in some embodiments, to a service provider associated with an event) in near-real time or at some point prior to an affected event, or at a time when the user would most likely desire to receive it. For example, upon determining that the user's flight is delayed, a notification may be provided to reschedule a restaurant reservation that has been affected by the delayed flight. Even more, contact information for the restaurant, which may have been determined as supplemental information, may also be provided thereby enabling a user to cancel or modify the reservation. Aspects of a user interface according to this example consumer application 290 are shown in FIG. 3A. Other affected events or related events can also be provided to the user either simultaneously or sequentially, such as presenting a second affected event after the user has initially handled the first affected event). Providing affected events to the user sequentially may be particularly useful in embodiments operating on a smart speaker so that the user is not overwhelmed with information.

In some embodiments, other affected events, updated events, or related events can also be provided to give the user a context for the affected event and how that relates to other (unaffected, but still related) events. For instance, while providing a notification about a change in the meeting time affecting a user's lunch reservation at a restaurant is beneficial, it may also be beneficial to provide the user's flight information for later that afternoon so that the user can determine how much time he has to eat lunch before he has to be at the airport. Aspects of a user interface according to this example consumer application 290 are shown in FIG. 3B.

One embodiment of consumer application 290 comprises a semi-automatic resolution service. In particular, a consumer application(s) for handling affected events 290 comprises a bot, which may be utilized to carry out a transaction on behalf of the user. A bot is a semi-autonomous software program or routine typically designed and configured to carry out tasks oriented with a particular goal, such as booking travel, presenting contact information, or scheduling/modifying a calendar entry. Accordingly, if it is determined that a friend is celebrating her birthday at a different restaurant than what was originally provided in a social media post, then a particular bot may receive information about the change in restaurant and receive information about a florist delivering flowers at the previous restaurant and automatically generate a message that can be sent to the florist communicating the updated restaurant location as the new drop-off location.

Similarly, another example embodiment of a consumer application 290 comprises functionality for a virtual assistant of the user to reschedule or cancel affected events on behalf of the user. Aspects of a user interface according to this example consumer application 290 are shown in FIG. 3D. For instance, a virtual assistant may reschedule an affected event by accessing contact information (which may be included as supplemental information) for an event entity, such as a reservation website or phone number. Or the virtual assistant may modify the event via the website or call the service provider on behalf of the user to attempt to modify the event. The virtual assistant may determine appropriate event time(s), location(s), or other attributes for the modification based on the impact to the affected event by the update event and, in some instances, also based on the user's schedule (which may be determined from user schedule(s) 248. For example, when rescheduling a rental car reservation impacted by a flight delay, the virtual assistant may access a website associated with the rental car company, provide reservation information to retrieve the reservation, and initiate a modification via the website. A new time for the car pickup may be determined based on the updated flight arrival time and the user's existing schedule. In some embodiments, the virtual assistant may engage with a bot associated with a service provider of the affected event. For example, some hotel and car rental service providers provide chat bots to facilitate making booking or modifying a reservation. In some instances, the virtual assistant may prompt the user for confirmation of an event modification or may recommend that an event be cancelled, if it is unable to be rescheduled.

As another example, a consumer application(s) for handling affected events 290 provides an automated service for the user, based on the user's affected events. In particular, consumer application(s) for handling affected events 290 may automatically communicate with a service provider of an affected event. For instance, if a user's flight is delayed such that it affects a user's hotel reservation check-in event and/or a car rental reservation (e.g., by requiring the user to pick up a rental car outside of regular business hours), based on knowledge of the user's new arrival time, a virtual assistant may automatically notify the hotel that the user will be checking in late or the rental car company that the user will be picking the car up after regular business hours. The hotel or the rental car company can then take the appropriate action to accommodate the user's delayed flight.

In some embodiments, consumer application(s) for handling affected events 290 tailors content for a user to provide the most relevant affected event(s) and information regarding that event(s) to the user in order to improve a user experience with a computing device. For example, a specific notification including particular affected events, such as those events that are most likely impacted by a change or those events that occur sooner (verses other events that are impacted but occur later) and information regarding those affected events may be generated, which may then be provided to presentation component 220. In some embodiments, consumer application(s) for handling affected events 290 generates the content including information regarding the event (e.g., updated event, affected event, or related events) and makes it available to presentation component 220, which determines when and how (i.e., what format) to present the notification based on user data. By providing the most relevant event(s) and information regarding that event (s) based on the change is user's circumstance, user-device performance is improved, battery-life may be better managed, and bandwidth consumption conserved. For example, content (such as content associated with the affected event, updated event, or relevant events) may be provided to the user in near-real time so that the user does not have to open different applications (e.g., a calendar application, an email application, or a web browser to locate contact information) on his computing device, which is especially helpful with devices having smaller screens (e.g., a mobile device or smartwatch) or no screens at all (a smart speaker). As a further example, bandwidth may be conserved as the user-device may not have to interact with cloud storage to retrieve all the events stored on a calendar application.

Example system 200 also includes a presentation component 220 that is generally responsible for providing to a user the event or information about the event generated by consumer application for handling affected events 290. Presentation component 220 may comprise one or more applications or services on a user device, across multiple user devices, or in the cloud. For example, in one embodiment, presentation component 220 manages the presentation of content to a user across multiple user devices associated with that user. In some embodiments, presentation component 220 includes or utilizes a text-to-speech program or service for converting text-based information regarding the event (which may be provided by consumer application for handling affected events 290) into speech, thereby enabling a voice-based interaction between a user and computer system.

In some embodiments, presentation component 220 may determine on which user device(s) a response is presented, as well as formatting parameters of the presentation (e.g., audio properties which may include the characteristics of a synthesized or computer-generated voice, speaking rate, pitch, tone, volume, and/or visual properties for some embodiments). Presentation component 220 may facilitate providing content, such as an event or information about the event, via one or more presentation component(s) 716 of a computing device 700, as described in connection to FIG. 7. For example, presentation component 220 may facilitate providing computerized speech, generated based on event or event information generated by consumer application for handling affected events 290, to an acoustic speaker associated with a computing device. In some embodiments, presentation component 220 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

Turning now to FIGS. 3A-D, illustrative aspects of embodiments described in connection to system 200 are shown. In particular, FIGS. 3A-D depict aspects of user interfaces associated with embodiments of consumer applications for handling affected events 290, as discussed in reference to FIG. 2. These examples are merely provided for context, and should not be seen as limiting.

With reference to FIG. 3A, an illustrative example of a graphical user interface ("GUI") 300 is depicted, which may operate on a personal computing device, showing aspects consumer applications for handling affected events 290. In some embodiments, a message 302 may identify the updated event for the user, which may indicate the change in user circumstance. As shown in GUI 300, the message 302 is displayed and notifies a user that her flight to Seattle-Tacoma has been updated. In some embodiments, GUI 300 may also display a message 304 warning the user that the updated event will affect other events.

In some embodiments, user interface 300 may be utilized to surface relevant affected events, such as a hotel reservation 306, a rental car reservation 309, and a dinner reservation 312. Additionally, user interface 300 may provide a GUI element associated with handling each of the affected events. As illustrated, the user interface 300 may display icons for receiving user input regarding how the user would like to handle the affected events. In some embodiments, the GUI icons allow a user to modify or cancel a reservation.

For example, as shown, the user interface 300 may provide GUI icons to cancel 307 or modify 308 a hotel reservation 306; cancel 310 or modify 311 a rental car reservation 309; or cancel 313 or modify 314 a dinner reservation 312. In some embodiments, in response to receiving user input, e.g., via GUI icons, embodiments may automatically cancel or modify the event and notify the service provider accordingly. In other embodiments, in response to receiving a modify selection, contact information for a service provider associated with that affected event may be displayed to the user (or a call or communication may be initiated) so that the user may contact the service provider and modify the event. In some embodiments, the user interface 300 may also provide an option to see all related events. As shown, the user interface 300 provides a GUI element 315 for receiving a user instruction to see all related events for the user's trip.

In some embodiments, based on the input received from the user, embodiments may communicate with the relevant service provider and/or entity on behalf of the user (e.g., utilizing a virtual assistant). For instance, if a user modifies a hotel reservation 306 and the rental car reservation 309, and cancels the dinner reservation 312, embodiments may communicate the user's desire with each service provider. For example, a virtual assistant may interact with the service provider's chat bot to modify the rental car reservation pick-up time to an after-hour pickup, call the hotel front desk to hold the hotel room, and inform the restaurant to cancel the dinner reservation through a dining application. In some embodiments, the virtual assistant may communicate with other entities besides the service provider, such as affected individuals. Affected individuals may include other event attendees, family members, or friends. For example, a virtual assistant may communicate with other dinner attendees that a dinner reservation has been cancelled.

With reference to FIG. 3B, an illustrative example of a graphical user interface ("GUI") 320 is depicted, which may operate on a personal computing device, showing aspects consumer applications for handling affected events 290. As shown, user interface 320 may provide a timeline diagram or a cascade perspective for viewing the context of affected events 327 and 329. Similar to user interface 300 of FIG. 3A, user interface 320 may present a notification 322 regarding the updated event (the flight) and a warning that the updated event may impact some of the user's other events. As described herein, some embodiments may include a parent entity. Embodiments may cause an indication regarding a parent entity 323 to also be presented, such as "Hawaii Vacation-May 2019."

As shown in the example embodiment of GUI 320, the timeline diagram includes related event entities and date-time information associated with the entity, which may comprise an attribute from the event entity. For instance, as shown, the user's flight 325 to San Francisco is delayed, and the timeline diagram indicates a new departure time 324 as "6:15 A". As described herein, it may be determined that this new departure time 324 affects other events of the user, including the user's flight to Hawaii (HNL) (shown as element 327), which is departing San Francisco at "7:00 A" (shown as element 326). Additionally, as shown, the new departure time 324 also affects the user's car rental 329 in Hawaii, which has a pick-up time of "2:00 P" (shown as element 328). In some embodiments, the affected events may be displayed in a different format than the unaffected events to draw the user's attention to the affected events, such as highlighted, in a different color, size, border, or similar differentiating format. As shown, both the user's flight out of San Francisco 327 and the user's car rental 329 are provided with a graphic and an indicia in the form of a dashed box.

Further, as described herein, embodiments may provide for display related events that are unaffected by an update to particular event. As shown in FIG. 3B, the timeline diagram may include a hotel reservation 333, starting at "4:00 P" (shown as element 332); a dining reservation 335 at "8:30 A" (shown as element 334); and surfing lessons 337 at and "10:30 A" (shown as element 336). In particular, the user is able to confirm, visually or otherwise, that these other events are not affected by the change in circumstances due to the flight delay.

Figure 3C:
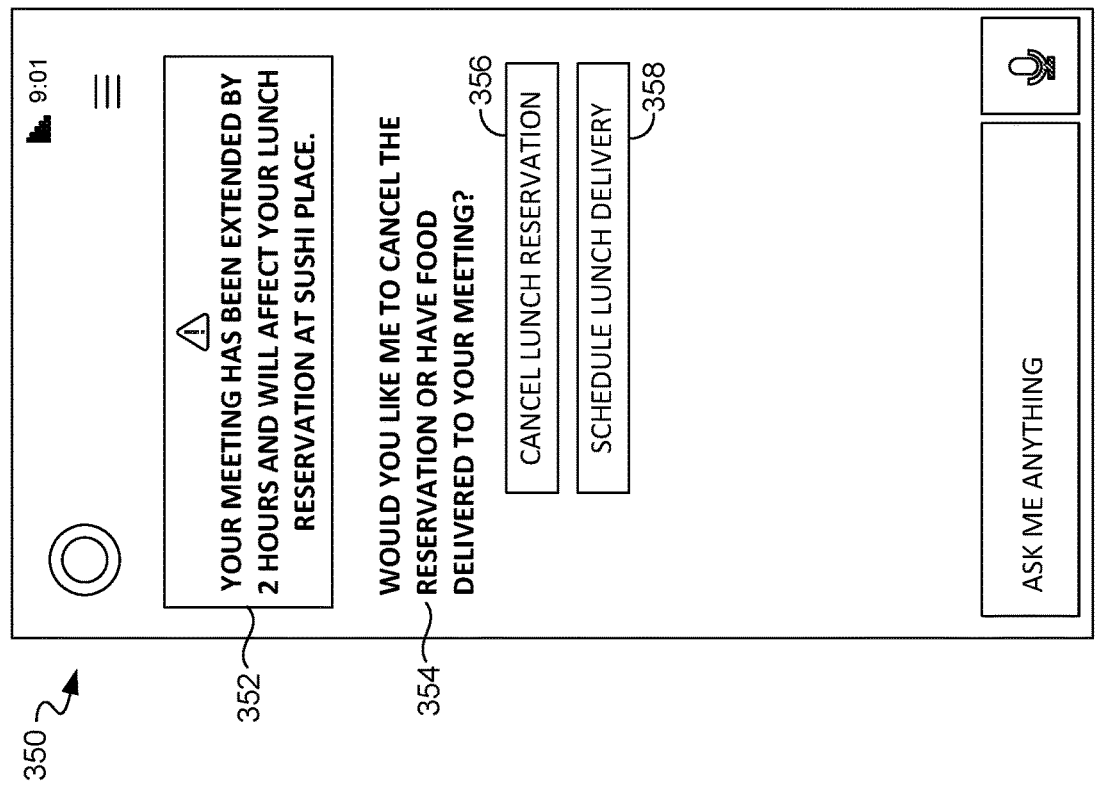
Figure 3D:
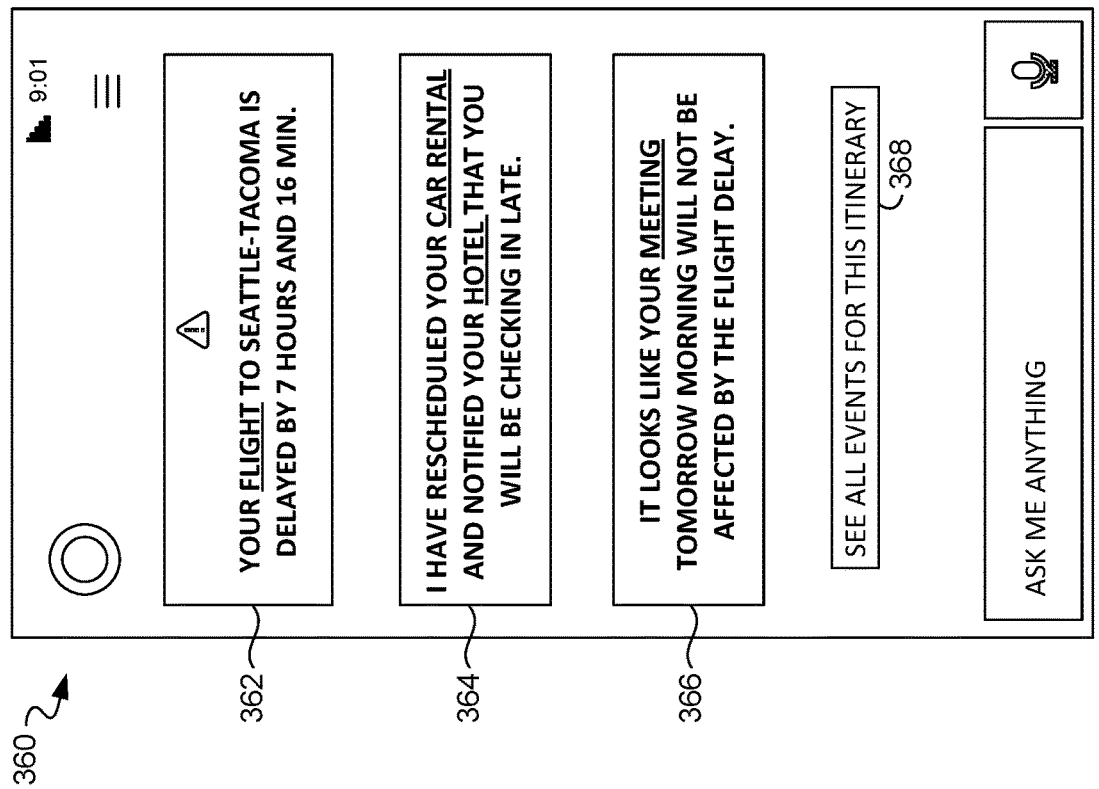

With reference to FIG. 3C, an illustrative example of a graphical user interface ("GUI") 350 is depicted, which may operate on a personal computing device, showing aspects consumer applications for handling affected events 290. As shown, a resolution service or a virtual assistant application may provide a notification 352 regarding an updated event, such as "Your meeting has been extended by 2 hours and will affect your lunch reservation at Sushi Place." As described herein, embodiments may facilitate the handling of the affected event. As shown in FIG. 3C, a resolution service or a virtual assistant application provides an option to cancel the reservation 356 or schedule a lunch delivery 358. Based on a user's input, the virtual assistant (or resolution service) may automatically cancel the lunch reservation and/or schedule a lunch delivery, for example, by calling the restaurant on behalf of the user (or contacting the restaurant via another means such as via a website or email) to cancel the reservation or schedule a delivery.

With reference to FIG. 3D, an illustrative example of a graphical user interface ("GUI") 360 is depicted, which may operate on a personal computing device, showing aspects consumer applications for handling affected events 290. In this example, a virtual assistant application (not shown) may present (graphically via GUI 360, or audibly, or both) a notification 362 about the affected event to the user and a message 364 indicating that it has already communicated with the respective service provider and/or entity. In particular, in this instance, a virtual assistant application provides a notification 362 stating that "Your Flight to Seattle-Tacoma is delayed by 7 hours and 16 minutes." Additionally, virtual assistant application 360 provides a message 364 that it has automatically handled an affected event, stating that "I have rescheduled your car rental and notified your hotel that you will be checking in late."

In some embodiments, hyperlinks may be included in a notification message regarding an affected event. For example, as shown, the notification 364 with a hyperlink 365 such that, if selected, a user may be provided more information about the affected event, such as details regarding the affected event (here, the car rental), a service provider's website, contact information, or similar additional details. For instance, in message 366, the word "meeting" is underlined, indicating that it is a hyperlink 367. If selected, a user may be provided more information regarding the meeting. As shown, "car rental" and "hotel" are also underlined, indicating that these words are associated with a hyperlink that a user could select to view more information regarding the event or service provider, such as an check-in or pick-up times, contact information, the service provider's website, or the like.

In some embodiments, personal assistant application 360 may also provide a user an option to view all related events. As shown, the personal assistant application 360 may provide a GUI element 368 that, if selected, will cause personal assistant application 360 to provide for display of all events for the user's itinerary.

Figure 4:
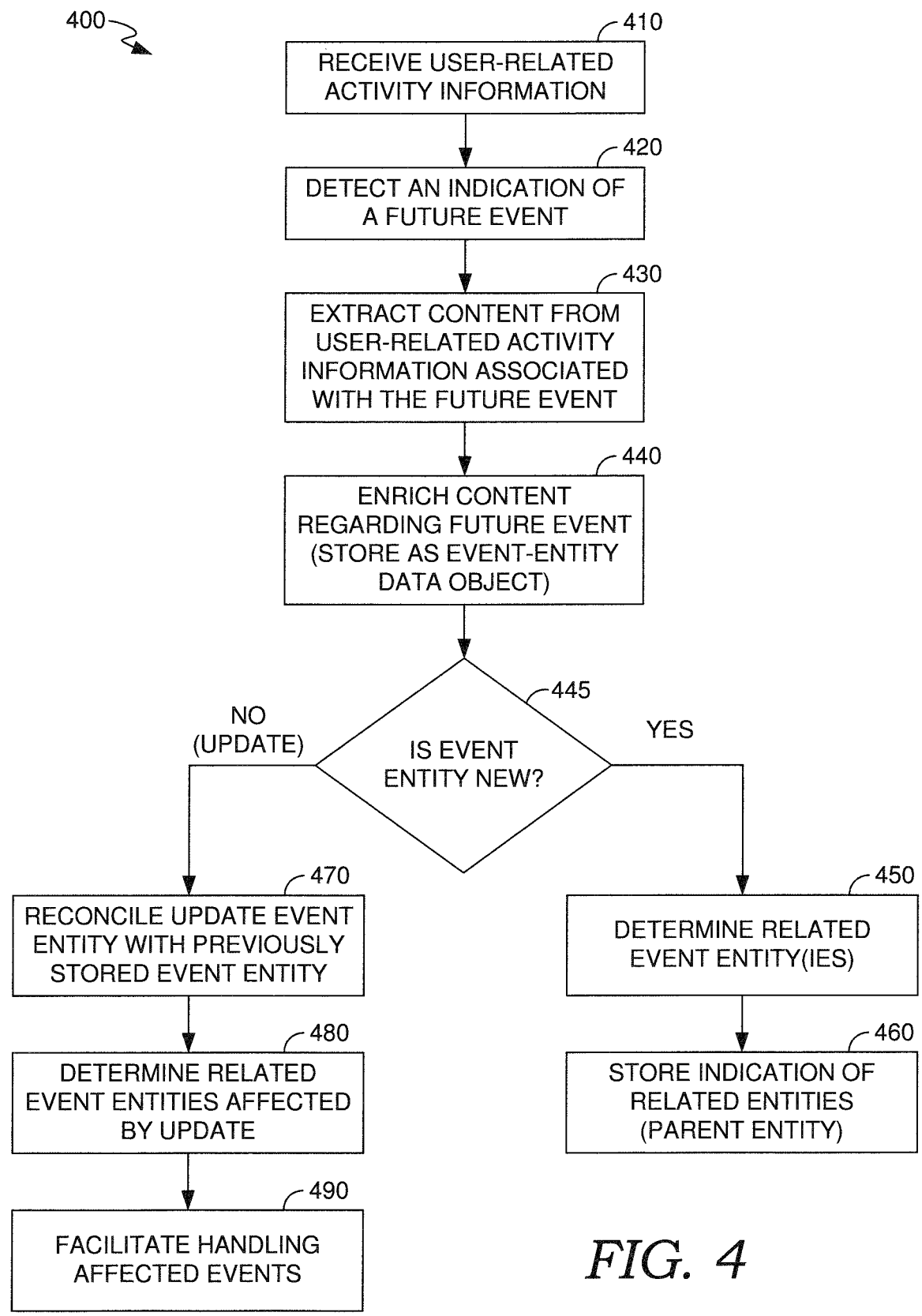
FIGS. 4 and 5 each depict an example process flow for facilitating an improved computer-performed schedule service for a user, in accordance with embodiments of the disclosure.

Turning now to FIG. 4, an aspect of an example process flow 400 are illustratively depicted for an embodiment of the disclosure. The blocks of process flow 400 that correspond to actions (or steps) to be performed (as opposed to information to be acted on) may be carried out by one or more computer applications or services, in some embodiments, including a virtual assistant, that operate on one or more user devices (such as user device 104a), servers (such as server 106), may be distributed across multiple user devices and/or servers, or may be implemented in the cloud.

In some embodiments, the functions performed by the steps of process flow 400 are carried out by components of system 200, described in connection to FIG. 2, and therefore improve a computing device. Among other improvements, the computer may be improved as it can discern the user's context across various platforms or software applications (even across multiple communication channels), and utilize the user's context to detect affected-events and provide resolution services. Conventional technology is generally dependent on a single source of information (e.g., a calendar application), a single format (e.g., a calendar application entry), and merely provides these entries for display. Additionally, conventional technology typically only accounts for a single attribute, such as time, in determining whether two events conflict (e.g., when two meetings are schedule at one time). The improvements by the technology described herein does not have these limitations. For example, the instant technology is contextually aware to the user's circumstances across multiple sources.

At block 410, user-related activity information is received. Information about user-related activity may be received from a variety of sources and across various platforms and formats. The user-related activity information may be received from one or more data sources, such as such as data sources 104a and 104b through 104n of FIG. 1. In addition, the user-related activity may be received via a sensor (such as sensors 103a and 107 of FIG. 1). Information about user-related activity may include any information associated with the user, including information sent or received through various communications channels (e.g., email, SMS text, instant messaging services, or the like) and internet activity, as described in greater detail herein. By way of example, the user may be texting his parents about their upcoming trip to visit him. While texting, the user's mother provides flight information, including an airline service provider, arrival time, and date, and states that she and the user's dad is excited to see him In his excitement, the user opens up an internet browser and books a reservation at his favorite restaurant near the airport. In some embodiments, user-related activity information may be received and stored in one or more data stores such as storage 225. In some embodiments, a user-data collection component, such as user-data collection component 210 of FIG. 2, may receive user-related data.

At block 420, an indication of an event is detected. Embodiments of block 420 detect an indication of an event for the user from the received user-related activity information. As described herein, an event may be detected by an event detector (such as event detector 260 of FIG. 2, and particularly, event identifier 264) using one or more classifiers (e.g., classifiers 230). The event can be any event that is associated with the user. For example, the user may have an upcoming reservation, meeting, appointment, party, task, or the like associated with the user. Some embodiments of block 420 may detect events based on user-related activity across different sources, such as described in connection with event detector 260. As such, the instant technology overcomes limitations with the previous technology, which is typically tied to a single source, such as an email/calendar software application.

Continuing with the above example, some embodiments of block 420 may detect an event from user-related activity information that includes communications such as emails or text messages. For instance, an embodiments of block 420 may detect an event from the user's text messages (e.g., a text thread) the user indicated that he will be picking his family up from the airport. Similarly, an embodiments of block 420 may detect an event from the user's internet activity (e.g., a restaurant website) that the user has made a dinner reservation for three people at a restaurant near the airport. Some embodiments of block 420 are performed by event detector 260, and more specifically an event identifier 264, such as described in connection to FIG. 2. Additional embodiments of block 420 are described in connection to event detector 260 of FIG. 2.

At block 430, information content associated with an event (e.g., event content) is extracted from an indication of user-related activity. Some embodiments of block 430 may be performed by an event detector 260 (or, more specifically, an event content extractor 266), as described in FIG. 2. Embodiments of block 430 may extract event-related data from information about the user-related activity. Continuing with the above example, an embodiment of block 430 may perform extraction of event content, from the user's text message(s), that the user's parents will be flying Acme Air and will be arriving on May 20th, around 4:30 PM. Similarly, an embodiment of block 430 may perform an extraction content regarding the user's dinner reservation from the user's web browser activity. For instance, the event detector may extract, a date of May 20th, a time of 5:30 PM, and a location near the airport. Information for the event(s) (e.g., extracted event content) can then be stored as event data object(s) (or event entity), such as a data object for the restaurant reservation and a data object for picking up the parents from the airport, for example. Some embodiments of block 440 may store the extracted event content in an event data object (or an event entity) associated with the event, such as event data objects (entities) 242 in a user profile 240, described in connection with FIG. 2. Additional embodiments of block 430 are described in connection to event content extractor 266 of FIG. 2.

At block 440, the event content regarding the event may be enriched. Embodiments of block 440 may enriched the extracted event content with supplemental information. Some embodiments of block 440 may be performed by an event detector 260 (or, more specifically, an event content enricher 268), as described in FIG. 2. As described herein, supplemental information may be derived or determined based on content extracted from the user-activity information. For instance, supplemental information may be determined proximate the time that event content is being extracted (e.g., in near-real time) or long after the event content is extracted (e.g., several days or months), such as when it becomes available.

Continuing with the above example, an embodiment of block 440 may perform event content enrichment regarding the location information (e.g., geolocation) for the airport based on the extracted content indicating the parent's flight destination airport code. Similarly, an embodiment of block 440 may perform event content enrichment regarding the restaurant's location and contact information (e.g., a phone number) based on extracted content form the dinner reservation, such as the name of the restaurant. Some embodiments of block 440 may store the supplemental information in an event data object event data object (or an event entity) associated with the event, such as event data objects (entities) 242 in a user profile 240, described in connection with FIG. 2. Additional embodiments of block 440 are described in connection to event content enricher 268 of FIG. 2.

At block 445, process flow 400 determines whether the event entity is associated with a new event or whether it regards a prior event, such as an update. In particular, at block 445, event content or an event data object (event entity), from a detected event, may be evaluated to determine whether the content or attributes in the event entity indicate that the event corresponds to a previously detected event or a new event that has not previously been detected and/or processed by an embodiment of process flow 400 or example system architecture 200. Some embodiments of block 445 may be performed by new event integrator 270 (or, more specifically, a new event identifier 272), or by updated event determiner 282, as described in FIG. 2.

Some embodiments of block 445 may be determined that a given event is new (or not) by determining whether an event data object exists having attributes that are identical or similar to the given event. In particular, in some embodiments, where it is determined that an existing event data object includes identical attributes or is sufficiently similar (which may be determined by a similarity score and a similarity threshold, such as described in connection to new event integrator 270 or affected events identifier 280), then the given event may be determined not to be new, and process flow 400 proceeds to block 470. On the other hand, if the attributes for the given event are not sufficiently similar to an event data object attributes, then it may be determined that the given event is a new event, and process flow 400 proceeds to block 450. Continuing with the example, an embodiment of block 445 may determine from event content determined from the text messages, that the parents' flight is a new event, as there is no event data object having attributes related to flight information involving that same time, date, or service provider. Similarly, an embodiment of block 445 may determine that the restaurant reservation is also a new event as there is no event data object having attributes related to restaurant reservations, or for attributes specifying that restaurant name, time, date, and/or location. Additional embodiments of block 445 are described in connection to new event identifier 272 and updated event determiner 282 of FIG. 2.

At block 450, two or more related event entities are determined. For instance, embodiments of block 450 may determine any event entities that are related to the given event that was determined to be new at block 445. Embodiments of block 450 may determine event entity relatedness by perform a comparison of one or more attributes or features associated with the event data objects, such as described herein, to identify a set of events having similar or related features. In some embodiments of block 450, event relatedness may comprise a parent or child relationship with other events. For instance, two or more events determined to be related may further be determined to be child events of a parent entity as described herein. Some embodiments of block 450 may be performed by new event integrator 270 (or, more specifically, a related events determiner 274), as described in FIG. 2.

Continuing with the example above, an embodiment of block 450 may determine that the restaurant reservation event related to the parent's flight event. For instance, an embodiment of block 450 may determine relatedness based on the event category information, a location attribute, and a temporal attribute. For instance, in some embodiments, an event data object for the restaurant reservation may be determined to be related to the event data object for the parents' flight based on the two events including a similar location attribute (i.e., the location of the airport). Further, an embodiment of block 450 may determine that the event data object for the restaurant reservation (and hence the restaurant reservation event) is related to the event data object for the parents' flight based on temporal attributes indicating the two events occurring within a time interval. (E.g., here, the two events are 1 hour apart at 4:30 PM and 5:30 PM). Additional embodiments of block 450 are described in connection to related events determiner 274 of FIG. 2.

At block 460, an indication of related event entities can be stored. Embodiments of block 460 may store a record or indication of the related events determined in block 450. For instance, in an embodiment, for each related event, the event data object corresponding to the event may be updated to include an indication of its related events, such as an event ID or identification of the event data objects of the related events. In one embodiment, two or more event data objects for related events may be stored as child events of a parent entity via a directed graph, a relational database entry, or stored with a set of pointers to the respective, related events. Continuing with the above example, the restaurant reservation event entity and the flight event entity may be stored as related child entities of a parent entity event, such as a "weekend with the parents" event. Additional embodiments of block 460 are described in connection to new event integrator 270 of FIG. 2.

As mentioned at block 445, embodiments of block 445 may determine that a given event entity is not new. In some embodiments of process flow 400, based on this determination at block 445, the given event may be processed as an update event starting in block 470. Continuing with the example above, an embodiment of block 445 may evaluate that an event entity object for a flight event has identical attributes (such as a flight number and booking reference number) corresponding to the existing flight event data object, and thus may comprise an update event for the flight. For instance, the updated event may be determined from an email sent by the user's mother indicating that the parents' Acme Air flight is delayed, the new arrival time is 5:45 PM, and that they are looking forward to seeing him today.

Accordingly, at block 470, an update event entity may be reconciled with an existing event entity, such as a previously stored event entity. Embodiments of block 470 may receive an event data object corresponding to an update event, and merge, conflate, or otherwise reconcile information from the update event with information from event data object(s) corresponding to the existing event for which the update regards. Some embodiments of block 470 may be performed by an event entity reconciliation 284, as described in FIG. 2. For example, as described herein, event entity reconciliation 284 or more generally an affected events identifier 280 may reconciles the update entity with an existing entity by conflating or reconciling information of the update entity and an existing entity, including its extracted content and/or supplemental information. Continuing with the example, the mother's email can be determined to have an update to the existing flight event based on a similar date, sender information (both communications were sent by the mother), and service provider (i.e., Acme Air), and block 470 may update the existing event entity for the parents flight to include the information about the new flight time in place of the original flight time information. Additional embodiments of block 470 are described in connection to event entity reconciliation 284 of FIG. 2.

At block 480, determine event entities related to events affected by an update. Embodiments of block 480 may determine set of events affected by an update event, such as the update event reconciled in block 470. In some embodiments of block 480, first, a set of one or more event entities that are modified due to event entity reconciliation may be determined. This may comprise the set of event entities acted on (or that were otherwise modified) during event entity reconciliation in block 470. Next, for each event entity that was changed during reconciliation, (i.e., for each of the modified event entities, from the set of event entities that were modified due to reconciliation), the set of one or more events related to that changed event entity are determined. This set of one or more events related to each changed event (changed due to an update) comprises a set of events that might be affected or impacted by changes from the update. Accordingly, next for each event entity that was changed during reconciliation, the impact of the changes (from the changed event entity on its set of related event entities) is determined, such as by detecting a conflict or likelihood of conflict, as described herein. Some embodiments of block 470 may be performed by an affected events determiner 286, as described in FIG. 2. Additional embodiments of block 480 are described in connection to affected events determiner 286 of FIG. 2.

Continuing with the above example, embodiments of block 480 may determine that the dinner reservation event entity is affected by the updated flight time because the updated flight time has an arrival attribute of 5:45 PM, which overlaps and thus conflicts with the dinner reservation time attribute of 5:30 PM.

At block, 490, the handling of the affected events is facilitated. In some embodiments, a consumer application(s) for handling affected events (such as consumer application (s) for handling affected events 290 of FIG. 2) may be utilized to provide a resolution service to handle the affected event. Accordingly, some embodiments of block 480 may be performed by a consumer application(s) 290, as described in FIG. 2. Additional embodiments of block 480 are described in connection to consumer application(s) 290 of FIG. 2 and FIGS. 3A-D. Continuing with the above example, a virtual assistant may communicate to the user his mother's flight is delayed and that the delay affects the restaurant reservation. It may further communicate prompt the user as to whether he would like to cancel or modify the restaurant reservation. Based on the user's response, the virtual assistant may communicate with the restaurant on the user's behalf. It should be appreciated that this may all be done without the user even viewing his mother's second email about the delayed flight. As such, the user is provided timely information that surfaces affected events and facilitates the handling of the affected event.

Figure 5:
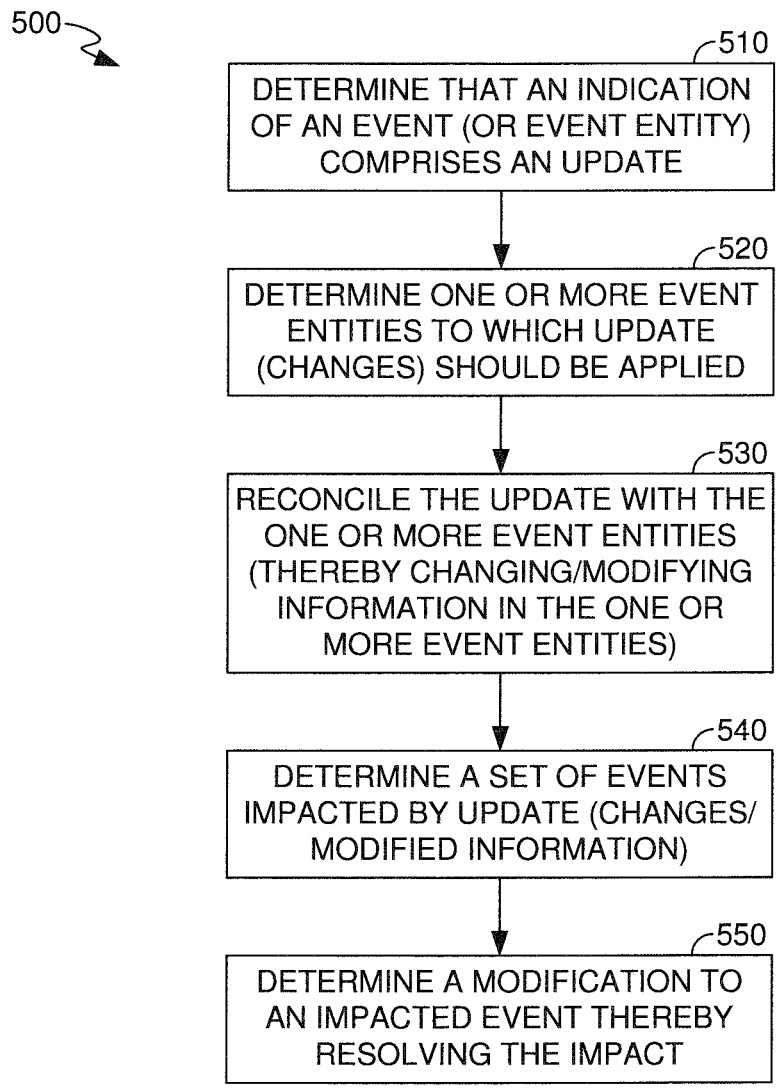

Turning now to FIG. 5, a flow diagram is provided illustrating an overview of an example process flow 500. At block 510, a first indication of user-related activity is determined to comprise updated event content for a first event associated with the user. Embodiments of block 510 determine updated event content from a first indication of user-related activity that is received from a user-data collection component, such as user-data collection component 210, described in FIG. 2. The indication of user-related activity may be communications, internet browser activity, or application activity.

In some embodiments, block 510 is performed by a new event integrator, such as new event integrator 270, described in FIG. 2. For example, an embodiment of block 510 may receive an event data object (or, in some instances, an enriched event data object) associated with an event. The event data object may be received from an event detector, such as event detector 260, as described in FIG. 2. In some embodiments, the indication of user-related activity may be analyzed, at block 510, to determine that event content in the received event data object is similar to an existing event data object, such as previously stored data object, and thus indicates an update.

Some embodiments of block 510 may be carried out by a computing system, and more specifically, by new event identifier 272 or an updated event determiner 282, such as described in FIG. 2. In some embodiments, the determination that the first indication of user-related activity comprises updated event content is provided to an affected events identifier, such as updated event determiner 282, described in FIG. 2. Additional details of embodiments of block 510 are provided in connection to new event identifier 272, in FIG. 2.

At block 520, one or more events to which the updated event content should be applied are determined. Embodiments of block 520 determine a set of existing event entities that an update (or changes from an update) regards or should be applied. Some embodiments of block 520 may determine the set of existing event entities that an update regards by comparing features or attributes of the update entity with the existing event entities. Attributes or features of a particular entity can be compared to other entities, and where identical or similar attributes are determined, then the particular entity may be determined to be an update entity. For example, where a particular entity has identical confirmation/reservation numbers, dates, location, event name, or other attributes as an existing entity, the particular entity may be determined to be an update entity that may comprise content to be merged or reconciled with an existing event entity. Some embodiments of block 520 may be performed by affected events identifier 280 or, more specifically, by updated event determiner 282, of FIG. 2. Additional embodiments of block 520 are described in connection to updated event determiner 282 of FIG. 2.

At block 530, reconcile the update with the one or more event entities. Embodiments of block 530 may reconcile the update, which may be determined in block 510, with the one or more event entities determined in block 520, which may comprise changing/modifying information in the one or more event entities based on the change information from the update. Some embodiments of block 530 may be performed by affected events identifier 280 or, more specifically, by event entity reconciliation 284 of FIG. 2. Additional embodiments of block 530 are described in connection to event entity reconciliation 284 of FIG. 2.

At block 540, determine a set of events impacted by update or impacted by changes of modifications to events due to the update. Embodiments of block 540 determine a set of events that are impacted by changes resulting from the update, which may be determined in step 510, being reconciled with the set of one or more entities determined in step 520. The update may indicate the change in a user's circumstance, thus some embodiments of block 540 may be considered to determine the user's events that are impacted from the change in the user's circumstances. Some embodiments of block 540 may be performed by affected events identifier 280 or, more specifically, by affected events determiner 286 of FIG. 2.

In some embodiments of block 540, a second event (which may represents an update event or an event changed due to an update) may be determined to impact the first event if there is conflict of information indicated by the attributes of event data objects for the events, such as an overlap in time or if the first event precludes the second event. For example, the first and second events may overlap in time if the two events occur at the same time. The first and second events may be precluded if a change in one event would result in making the other impossible or impractical for a user to carry out, which may be specified in rules or logic, as described in connection to affected events identifier 280. For example, a delayed flight that lands at 1:45 PM may directly conflict with a scheduled taxi service set to pick the user up from the airport at 12:45 PM, as these times overlap. Similarly, the delayed flight may impact a meeting at 2:00

PM as the delayed arrival time may prevent the user from arriving, picking up his or her luggage, and attending the meeting. Additional embodiments of block 540 are described in connection to affected events determiner 286 of FIG. 2.

At block 550, determine a modification to an impacted event. Embodiments of block 550 comprise determining, and in some instances applying, a modification to an impacted event to mitigate the impact caused by an update, which may represent a change in the user's circumstances. Some embodiments of block 550 comprise determining or utilizing a resolution service for the impacted event (i.e., a second event) and/or the event that is responsible for the impact (i.e., a first event). Some embodiments of block 550 may be performed by a consumer application for handling affected events, such as a consumer application 290, described in connection to FIG. 2 or FIGS. 3A-D.

In some embodiments, a resolution service allows the user to efficiently manage a first event or second event. In some embodiments, the resolution service allows a user to modify the first or second event. In one embodiment, the resolution service may be determined based on the event category. By way of example and not limitation, if the first event is a meeting for work and the second event is a restaurant reservation, a resolution service may include presenting an option to cancel the restaurant reservation or decline the meeting invitation. Based on user input, this example embodiment of a resolution service can take the appropriate action. For instance, if a user selects "decline," embodiments may respond to the meeting invitation by accessing the user's calendar application and declining the meeting invitation. If a user selects "cancel reservation," embodiments may notify the restaurant on the user's behalf to cancel the reservation. While not shown, in some embodiments, the resolution service is an option to reschedule the first or second event or notify a particular entity (e.g., a service provider or other meeting attendees).

Additionally, while not shown in FIG. 5, process flow 500 may comprise automatically modifying an impacted event (such as the first or second event) and notifying a service provider associated with the impacted event (i.e., the first or second event). Thus from the example described in the previous paragraph, in an embodiment of block 550, a user's virtual assistant may resolve the impact by contacting the restaurant on the user's behalf and indicate that the user would like to modify the reservation and make the reservation for 1:00 PM instead of 12:00 PM. In some embodiments, a resolution service determined or utilized by block 550 may determine which event to modify (the impacted event or the event responsible for the impacting) based event dependency, such as described in connection to FIG. 2. In some embodiments, block 550 (or a consumer application(s) for handling affected events 290) may determine that the first or second event has been modified by receiving a confirmation from the service provider. Continuing with the example above, the hostess of the restaurant may confirm over the phone that the reservation can be changed to 1:00 PM instead of 2:00 PM.

Figure 7:
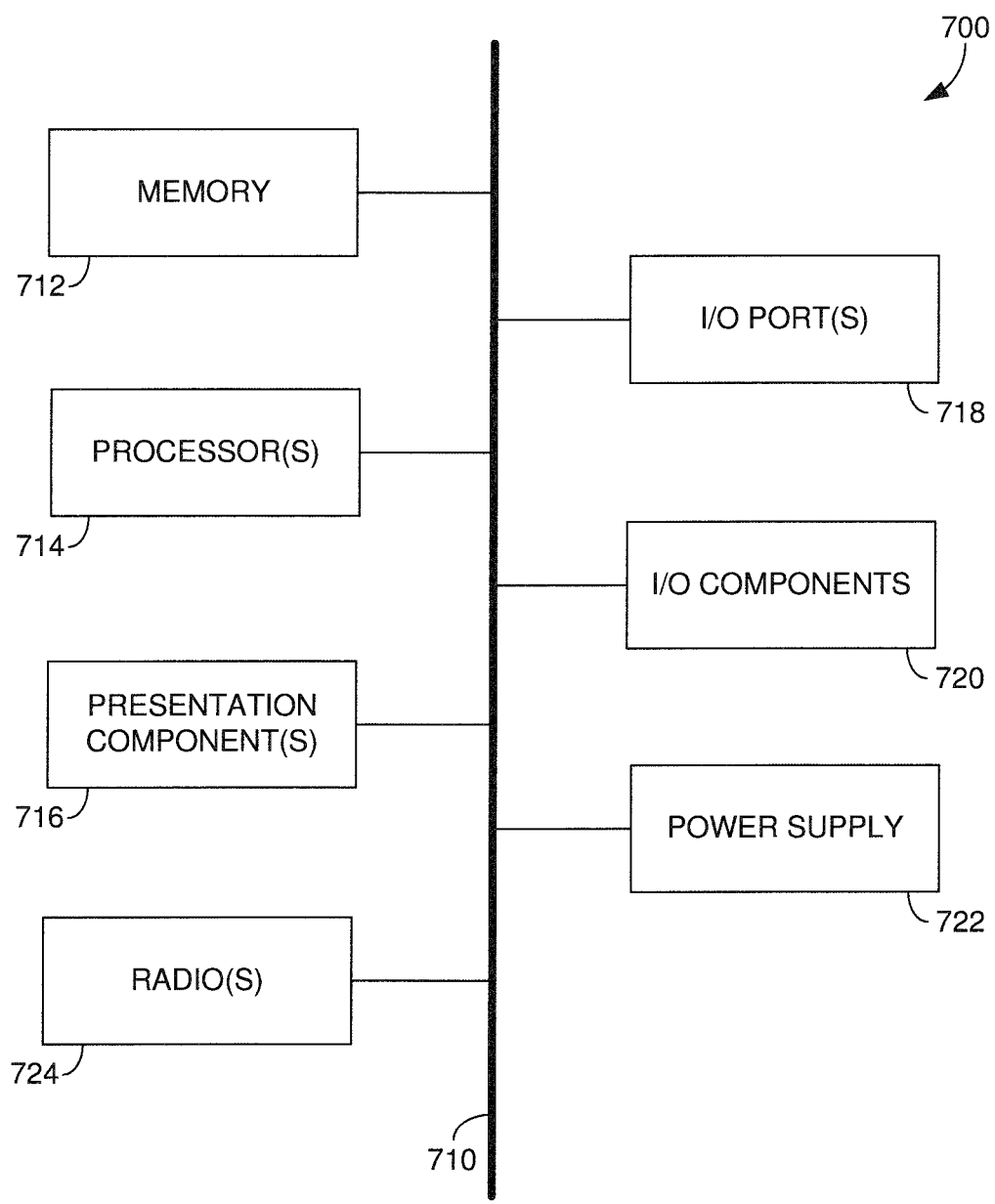
FIG. 7 is a block diagram of an exemplary computing environment suitable for use in implementing an embodiment of the disclosure.

Having described various embodiments of the disclosure, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1. A computerized method for a contextualized schedule service, comprising: detecting, from user-related activity information, an indication of a first future event associated with a user; extracting event content for the first future event from the user-related activity information; determining that the event content for the first future event comprises updated event content for the first future event; generating reconciled event content for the first future event by reconciling the updated event content with the extracted event content; determining that a second future event is related to the first future event based on a plurality of attributes comprising a temporal attribute and an event category; and generating a resolution service for the first future event or the second future event based on utilizing the reconciled event content to determine that the second future event is likely to be affected by the first future event.

Embodiment 2. The computerized method of embodiment 1, wherein the extracted event content is enriched with supplemental information.

Embodiment 3. The computerized method of any of embodiments 1-2, wherein the supplemental information comprises: contact information for a service provider of a future event, location information for the future event, expected attendees associated with the first future event, or contact information for the expected attendees.

Embodiment 4. The computerized method of any of embodiments 1-3, wherein the first future event is detected from a first source and the second future event is detected from a second source that is different from the first source.

Embodiment 5. The computerized method of any of embodiments 1-4, wherein the first and second source are one of an SMS text, an email application, internet browser activity, social media activity, audio input, or a calendar application.

Embodiment 6. The computerized method of any of embodiments 1-5, wherein generating a resolution service comprises: providing a message that the second future event is affected and providing an indication to cancel or modify the first or second future event.

Embodiment 7. The computerized method of any of embodiments 1-6, wherein generating a resolution service comprises automatically rescheduling the first or second future event.

Embodiment 8. The computerized method of any of embodiments 1-7, wherein automatically re-scheduling the first or second future event comprises notifying a service provider and receiving an updated time.

Embodiment 9. A computing device for a contextual scheduling service, comprising: one or more processors; and computer storage memory having computer-executable instructions stored thereon which, when executed by the processor, implement a method comprising: detecting, from a first indication of user-related activity, an indication of a first future event associated with a user and extracting first event content for the first future event; detecting, from a second indication of user-related activity information, an indication of a second future event associated with the user and extracting second event content for the second future event; determining that a second future event is related to the first future event based on a plurality of attributes comprising a temporal attribute and an event category; and generating a resolution service for the first future event or the second future event based on determining that the second future event is likely to be affected by the first future event.

Embodiment 10. The computing device of embodiment 9, the method further comprising: generating reconciled event content for the first future event by extracting, from a third indication of user-related activity information, updated event content for the first future event and reconciling the updated event content with the first event content.

Embodiment 11. The computing device of any of embodiments 9-10, the method further comprising: generating a first enriched data object for the first future event by enriching the first extracted event content with supplemental information; and generating a second enriched data object for the second future event by enriching the second extracted event content with supplemental information.

Embodiment 12. The computing device of any of embodiments 9-11, wherein determining that the second future event is related to the first future event is based on determining that the first enriched data object is related to the second enriched data object.

Embodiment 13. The computing device of any of embodiments 9-12, wherein the first future event is detected from a first source and the second future event is detected from a second source that is different from the first source.

Embodiment 14. The computing device of any of embodiments 9-13, wherein the first source is an email and the second source is one of SMS text, internet browser activity, social media activity, audio input, or a calendar application.

Embodiment 15. The computing device of any of embodiments 9-14, wherein generating a resolution service comprises: providing a message that the second future event is affected and providing an indication to cancel or modify the first or second future event.

Embodiment 16. The computing device of any of embodiments 9-15, wherein generating a resolution service comprises automatically rescheduling the first or second future event.

Embodiment 17. Computer-storage media having computer-executable instructions stored thereon, which when executed by one or more processors, provide a contextual schedule service, the method comprising: determining that a first indication of user-related activity comprises updated event content for a first future event associated with the user; determining one or more events from a set of related events to which the updated event content should be applied; generating reconciled event content for the first future event by reconciling the updated event content with previously extracted event content for the first future event; based on the reconciled event content, determining that a second future event is likely to be impacted by the first future event; and determining a resolution service for the first or second future event to be provided for display.

Embodiment 18. The computer-storage media of embodiment 17, wherein the related events are related based on a temporal attribute and an event category attribute.

Embodiment 19. The computer-storage media of any of embodiments 17-18, wherein determining a resolution service includes automatically modifying the first or future event and notifying a service provider associated with the first or second future event.

Embodiment 20. The computer-storage media of any of embodiments 17-19, further comprising: determining that the first or second future event has been modified by receiving a confirmation from the service provider.

The invention claimed is:

1. A computerized method for a contextualized schedule service, comprising:
   detecting, from an electronic communication, an indication of a first future event associated with a user;
   extracting event content for the first future event from the electronic communication;
   determining that the event content for the first future event comprises updated event content for the first future event;
   generating reconciled event content for the first future event by reconciling the updated event content with previously stored event content for the first future event;
   determining a plurality of future events related to the first future event based on a similarity of a first attribute associated with the first future event and the plurality of future events, thereby forming a plurality of related future events; and
   generating a resolution service based on utilizing the reconciled event content (i) to determine that a second future event of the plurality of related future events is affected by the first future event based on a comparison of a second attribute of the second future event and the second attribute of the reconciled event content, and (ii) to determine that a third future event of the plurality of related future events is not affected by the first future event based on a comparison of the second attribute of the third future event and the second attribute of the reconciled event content, the resolution service comprising:
   providing, via a user interface of a mobile device, a notification of the updated event content for the first future event, an indication that the second future event is affected by the first future event, and an indication that the third future event is not affected by the first future event, at least the second future event associated with a respective service provider, and
   providing, via the user interface, respective user-selectable options for modifying or canceling the second future event, wherein a selection of a user-selectable option initiates a communication to the respective service provider canceling or modifying the second future event associated with the respective service provider.

2. The computerized method of claim 1, wherein the event content is enriched with supplemental information.

3. The computerized method of claim 2, wherein the supplemental information comprises: contact information for the respective service providers of the plurality of future events, location information for the plurality of future events, expected attendees associated with the first future event, or contact information for the expected attendees.

4. The computerized method of claim 1, each of the plurality of related future events are determined from a source comprising one of an SMS text, an email application, internet browser activity, social media activity, audio input, or a calendar application.

5. The computerized method of claim 1, further comprising determining that the future event associated with the respective service provider has been modified or canceled by receiving a confirmation from the respective service provider.

6. The computerized method of claim 1, wherein the first future event comprises an airline flight, a hotel reservation, a car rental reservation, a dining reservation, a meeting, a performance, or a concert.

7. The computerized method of claim 1, wherein the indication of the first future event is detected based on at least one of a service provider, domain information, confirmation or reservation information, a tracking number, an itinerary number, a flight number, a check-in time, a check-out time, a pick-up time, a drop-off time, an agenda, a key word, a topic, a location, a date, a format, or a source of information, within the electronic communication.

8. The computerized method of claim 1, wherein the first attribute of the first future event and the plurality of future events share a temporal attribute, a location attribute, or an event category attribute, wherein the temporal attribute comprises a time interval, a timeframe, or a time threshold, and wherein the second attribute of the second future event, the second attribute of the third future event, and the second attribute of the reconciled event content share a temporal attribute, a location attribute, or an event category attribute, wherein the temporal attribute comprises a time interval, a timeframe, or a time threshold.

9. A computing device for a contextual scheduling service, comprising:

at least one processor; and computer storage memory having computer-executable instructions stored thereon which, when executed by the at least one processor, implement a method comprising:

detecting, from a first indication of user-related activity comprising a user-related communication, an indication of a first future event associated with a user and extracting first event content for the first future event;

detecting, from at least a second indication of user-related activity information, indications of a plurality of future events associated with the user and extracting multiple event content for the plurality of future events;

determining that the plurality of future events are related to the first future event based on a similarity of a first attribute associated with the first future event and the plurality of future events, thereby forming a plurality of related future events; and generating a resolution service based on (i) determining, based on a comparison of a second attribute of a second future event and the second attribute of the reconciled event content, that the second future event of the plurality of related future events is affected by the first future event, and (ii) determining, based on a comparison of the second attribute of a third future event and the second attribute of the reconciled event content, that the third future event of the plurality of related future events is not affected by the first future event, the resolution service comprising:

providing, via a user interface of a mobile device, a message listing the second future event as affected by the first future event and the third future event as not affected by the first future event, at least the second future event associated with a respective service provider, and providing, via the user interface, respective user-selectable options for modifying or canceling the second future event, wherein a selection of a user-selectable option initiates a communication to the respective service provider canceling or modifying the second future event associated with the respective service provider.

10. The computing device of claim 9, the method further comprising: generating reconciled event content for the first future event by extracting, from a third indication of user-related activity information, updated event content for the first future event and reconciling the updated event content with the first event content.

11. The computing device of claim 9, the method further comprising:

generating a first enriched data object for the first future event by enriching the first event content with first supplemental information; and generating a plurality of enriched data objects for the plurality of future events by enriching the multiple event content with second supplemental information.

12. The computing device of claim 11, wherein determining that the plurality of future events are related to the first future event is based on determining that the first enriched data object is related to the plurality of enriched data objects.

13. The computing device of claim 12, wherein the first future event is detected from a first source and the plurality of future events are detected from at least a second source that is different from the first source.

14. The computing device of claim 9, the method further comprising determining that the future event has been modified or canceled by receiving a confirmation from the respective service provider.

15. The computing device of claim 9, the user-related communication comprising an email, a text, an instant message, or a call; and wherein the indication of the first future event is detected based on at least one of a service provider, domain information, confirmation or reservation information, a tracking number, an itinerary number, a flight number, a check-in time, a check-out time, a pick-up time, a drop-off time, an agenda, a key word, a topic, a location, a date, a format, or a source of information, within the user-related communication.

16. Computer-storage media having computer-executable instructions stored thereon, which when executed by one or more processors, provide a method for a contextual schedule service, the method comprising:

determining, from user-related activity, that a first indication of user-related activity comprises updated event content for a first future event associated with a user;

determining a plurality of future events from a set of related events to which the updated event content should be applied, wherein the related events are determined to be related based on a similarity of a first attribute associated with the first future event and the plurality of future events, thereby forming a plurality of related future events;

generating reconciled event content for the first future event by reconciling the updated event content with previously extracted event content for the first future event;

based on the reconciled event content, determining (i) that a second future event of the plurality of related future events is impacted by the first future event and (ii) that a third future event of the plurality of related future events is not impacted by the first future event, wherein the second future event is determined to be affected by the first future event based on a comparison of a second attribute of the second future event and the second attribute of the reconciled event content, and wherein the third future event is determined not to be affected by the first future event based on a comparison of the second attribute of the third future event and the second attribute of the reconciled event content; and determining a resolution service to be provided for display, the resolution service comprising:

provering, via a user interface having limited input capability, a notification of the updated event content for the first future event, and providing, via the user interface, an indication that the second future event is impacted by the first future event and an indication that the third future event is not impacted by the first future event, at least the second future event associated with a respective service provider, and respective user-selectable options for modifying or canceling the second future event, wherein a selection of a user-selectable option initiates a communication to the respective service provider canceling or modifying the second future event associated with the respective service provider.

17. The computer-storage media of claim 16, the plurality of event attributes having in common a temporal attribute, a location attribute, and an event category attribute, wherein the temporal attribute comprises a time interval, a timeframe, or a time threshold.

18. The computer-storage media of claim 16, the method further comprising:

determining that the future event has been modified or canceled by receiving a confirmation from the respective service provider.

19. The computer-storage media of claim 16, the user-related activity comprising an email, a text, an instant message, a call, a chat, a social media post, a voice mail, internet-browsing activity, app activity on a user computing device, or a purchase transaction.

20. The computer-storage media of claim 19, wherein the updated event content based on at least based on at least one of a service provider, domain information, confirmation or reservation information, a tracking number, an itinerary number, a flight number, a check-in time, a check-out time, a pick-up time, a drop-off time, an agenda, a key word, a topic, a location, a date, a format, or a source of information, within the user-related activity.

* * * * *